United States Patent
Thakur et al.

(10) Patent No.: US 10,845,987 B2
(45) Date of Patent: *Nov. 24, 2020

(54) SYSTEM AND METHOD OF USING TOUCH INTERACTION BASED ON LOCATION OF TOUCH ON A TOUCH SCREEN

(71) Applicant: INTELLIGENT PLATFORMS, LLC, Charlottesville, VA (US)

(72) Inventors: Pavan Kumar Singh Thakur, Andhra Pradesh (IN); Jagadeesh Jinka, Andhra Pradesh (IN); Chaithanya Guttikonda, Andhra Pradesh (IN); Pawan Kumar, Andhra Pradesh (IN)

(73) Assignee: INTELLIGENT PLATFORMS, LLC, Charlottesville, VA (US)

( * ) Notice: Subject to any disclaimer, the term of this patent is extended or adjusted under 35 U.S.C. 154(b) by 149 days.

This patent is subject to a terminal disclaimer.

(21) Appl. No.: 15/145,087

(22) Filed: May 3, 2016

(65) Prior Publication Data

US 2017/0322720 A1   Nov. 9, 2017

(51) Int. Cl.
*G06F 3/0488* (2013.01)
*G06F 21/36* (2013.01)

(52) U.S. Cl.
CPC .......... *G06F 3/04883* (2013.01); *G06F 21/36* (2013.01)

(58) Field of Classification Search
CPC .. G06F 3/0488; G06F 3/0481; G06F 3/04883; G06F 2203/04804
See application file for complete search history.

(56) References Cited

U.S. PATENT DOCUMENTS

| 4,099,247 | A |  | 7/1978 | Mikada et al. |
| 5,900,877 | A | * | 5/1999 | Weiss ................. G06F 3/04847 715/803 |
| 7,062,716 | B2 | * | 6/2006 | Washington ............. G06F 8/34 715/763 |
| 7,593,000 | B1 | * | 9/2009 | Chin ................... G06F 3/04883 345/156 |

(Continued)

FOREIGN PATENT DOCUMENTS

| CN | 101251884 A | 8/2008 |
| CN | 102592524 A | 7/2012 |

(Continued)

OTHER PUBLICATIONS

Jiao, et al., "An Investigation of Two-Handled Manipulation and Related Techniques in Multi-touch Interaction", Machine Vision and Human-Machine Interface (MVHI), 2010, 565-568.

(Continued)

*Primary Examiner* — Ryan F Pitaro
(74) *Attorney, Agent, or Firm* — Marshall, Gerstein & Borun LLP

(57) ABSTRACT

Exemplified herein is a system and method to accept password on a touch-screen HMI (human-machine interface) device. The system and method uses a combination of tactile gestures that are each received at predefined quadrants (or regions) or the touch-screen. The combination of such tactile gestures and quadrant information are used as a shortcut sequence to a user-interface (UI) function call, e.g., change zoom parameter of a presented screen of the display, navigate to a next presented screen, navigate to a previous presented screen.

20 Claims, 19 Drawing Sheets

(56) References Cited

U.S. PATENT DOCUMENTS

| | | |
|---|---|---|
| 8,059,101 B2 | 11/2011 | Westerman et al. |
| 8,125,312 B2 | 2/2012 | Orr |
| 8,255,867 B1 | 8/2012 | Chaplin et al. |
| 8,286,102 B1* | 10/2012 | Wilensky ............ G06F 3/04845 |
| | | 715/782 |
| 8,405,616 B2 | 3/2013 | Jung et al. |
| 8,445,793 B2 | 5/2013 | Mullens et al. |
| 8,458,485 B2* | 6/2013 | Bandyopadhyay ... G06F 21/316 |
| | | 713/184 |
| 8,525,799 B1* | 9/2013 | Grivna ................. G06F 3/0416 |
| | | 345/173 |
| 8,536,978 B2* | 9/2013 | Coggill ................ G06F 21/36 |
| | | 340/5.54 |
| 8,619,052 B2 | 12/2013 | Benko et al. |
| 8,638,939 B1* | 1/2014 | Casey .................. G06F 21/36 |
| | | 380/277 |
| 8,686,958 B2* | 4/2014 | Rutledge ............ G06F 3/04883 |
| | | 345/173 |
| 8,823,642 B2* | 9/2014 | Valik ................... G06F 3/0304 |
| | | 345/156 |
| 8,824,040 B1 | 9/2014 | Buchheit et al. |
| 8,830,072 B2 | 9/2014 | Batra et al. |
| 9,001,061 B2 | 4/2015 | Locker et al. |
| 9,030,418 B2 | 5/2015 | Bang et al. |
| 9,165,159 B1 | 10/2015 | McDonnell |
| 9,189,614 B2 | 11/2015 | DeLuca |
| 9,262,603 B2* | 2/2016 | Dow ..................... G06F 21/31 |
| 9,357,391 B1* | 5/2016 | Alsvig ................. H04W 12/06 |
| 9,460,575 B2* | 10/2016 | Park .................... G07C 9/00134 |
| 9,600,103 B1 | 3/2017 | Eischeid et al. |
| 9,703,392 B2* | 7/2017 | Wakabayashi ........ G06F 3/0237 |
| 9,983,664 B2 | 5/2018 | Kim et al. |
| 2002/0054120 A1 | 5/2002 | Kawano et al. |
| 2002/0109677 A1* | 8/2002 | Taylor .................. G06F 3/0233 |
| | | 345/173 |
| 2002/0140688 A1 | 10/2002 | Steinberg et al. |
| 2002/0167500 A1 | 11/2002 | Gelbman |
| 2004/0003036 A1 | 1/2004 | Eagle et al. |
| 2004/0156170 A1 | 8/2004 | Mager et al. |
| 2006/0284852 A1 | 12/2006 | Hofmeister et al. |
| 2007/0024551 A1 | 2/2007 | Gelbman |
| 2007/0177803 A1 | 8/2007 | Elias et al. |
| 2007/0285385 A1 | 12/2007 | Albert et al. |
| 2008/0136587 A1 | 6/2008 | Orr |
| 2008/0303637 A1 | 12/2008 | Gelbman et al. |
| 2009/0051648 A1* | 2/2009 | Shamaie ................ G06F 3/017 |
| | | 345/156 |
| 2009/0089701 A1* | 4/2009 | Baier ................ G05B 19/0426 |
| | | 715/772 |
| 2009/0122018 A1 | 5/2009 | Vymenets et al. |
| 2009/0135147 A1 | 5/2009 | Hsu et al. |
| 2009/0195496 A1 | 8/2009 | Koyama et al. |
| 2009/0225023 A1 | 9/2009 | Szolyga et al. |
| 2009/0262379 A1 | 10/2009 | Miyake et al. |
| 2009/0278807 A1 | 11/2009 | Hu et al. |
| 2009/0322700 A1 | 12/2009 | D'Souza et al. |
| 2010/0020025 A1* | 1/2010 | Lemort ............... G06F 3/04883 |
| | | 345/173 |
| 2010/0031200 A1 | 2/2010 | Chen et al. |
| 2010/0031344 A1 | 2/2010 | Zhao et al. |
| 2010/0073303 A1 | 3/2010 | Wu et al. |
| 2010/0115473 A1* | 5/2010 | Reeves ............... G06F 3/04883 |
| | | 715/863 |
| 2010/0138764 A1* | 6/2010 | Hatambeiki ........... G08C 17/02 |
| | | 715/765 |
| 2010/0162182 A1* | 6/2010 | Oh ..................... G06F 3/04883 |
| | | 715/863 |
| 2010/0177660 A1 | 7/2010 | Essinger et al. |
| 2010/0194702 A1 | 8/2010 | Chen |
| 2010/0245102 A1 | 9/2010 | Yokoi |
| 2010/0245341 A1 | 9/2010 | Tanaka |
| 2010/0322485 A1* | 12/2010 | Riddiford ............... G06F 21/36 |
| | | 382/115 |
| 2011/0041102 A1* | 2/2011 | Kim .................... G06F 3/04883 |
| | | 715/863 |
| 2011/0069018 A1 | 3/2011 | Atkins et al. |
| 2011/0078568 A1* | 3/2011 | Park ................... G06F 3/04883 |
| | | 715/702 |
| 2011/0156867 A1 | 6/2011 | Carrizo et al. |
| 2011/0157375 A1 | 6/2011 | Kusumoto |
| 2011/0175839 A1 | 7/2011 | Prabhu |
| 2011/0242022 A1 | 10/2011 | Wen |
| 2011/0260829 A1* | 10/2011 | Lee ..................... G06F 3/0414 |
| | | 340/5.51 |
| 2011/0273388 A1* | 11/2011 | Joo ..................... G06F 3/0488 |
| | | 345/173 |
| 2011/0285645 A1* | 11/2011 | Cho .................... G06F 3/0416 |
| | | 345/173 |
| 2011/0320978 A1* | 12/2011 | Horodezky ............ G06F 3/0488 |
| | | 715/823 |
| 2012/0023574 A1* | 1/2012 | Osborn ................... G06F 21/36 |
| | | 726/19 |
| 2012/0066650 A1 | 3/2012 | Tirpak et al. |
| 2012/0184368 A1 | 7/2012 | Yamaoka |
| 2012/0206474 A1* | 8/2012 | Holland ................. G09G 5/026 |
| | | 345/589 |
| 2012/0256863 A1* | 10/2012 | Zhang ................. G06F 3/04883 |
| | | 345/173 |
| 2012/0291120 A1* | 11/2012 | Griffin .................... G06F 21/36 |
| | | 726/19 |
| 2012/0306793 A1* | 12/2012 | Liu ..................... G06F 3/04883 |
| | | 345/173 |
| 2013/0033436 A1 | 2/2013 | Brinda et al. |
| 2013/0057070 A1 | 3/2013 | Onishi et al. |
| 2013/0104065 A1* | 4/2013 | Stecher ................ G06F 3/0481 |
| | | 715/767 |
| 2013/0135178 A1 | 5/2013 | Miyahara |
| 2013/0227496 A1* | 8/2013 | Maekawa .......... H04N 1/00411 |
| | | 715/863 |
| 2013/0241844 A1 | 9/2013 | Chang et al. |
| 2013/0268900 A1* | 10/2013 | Ferren ..................... G06F 3/044 |
| | | 715/863 |
| 2013/0298071 A1* | 11/2013 | Wine .................. G06F 3/04883 |
| | | 715/780 |
| 2014/0026055 A1* | 1/2014 | Cohn ................... G06F 3/0482 |
| | | 715/727 |
| 2014/0035853 A1 | 2/2014 | Ok et al. |
| 2014/0092031 A1* | 4/2014 | Schwartz .............. G06F 1/3206 |
| | | 345/173 |
| 2014/0109018 A1* | 4/2014 | Casey ................ G06F 3/04895 |
| | | 715/863 |
| 2014/0123080 A1* | 5/2014 | Gan ..................... G06F 3/0481 |
| | | 715/863 |
| 2014/0143859 A1* | 5/2014 | Linge ..................... G06F 21/36 |
| | | 726/19 |
| 2014/0173529 A1* | 6/2014 | Hicks ................. G06F 3/04883 |
| | | 715/863 |
| 2014/0189855 A1 | 7/2014 | Moradi et al. |
| 2014/0223381 A1* | 8/2014 | Huang ................ G06F 3/04883 |
| | | 715/863 |
| 2014/0223549 A1 | 8/2014 | Quintanilla et al. |
| 2014/0245203 A1 | 8/2014 | Lee et al. |
| 2014/0267015 A1 | 9/2014 | Saatchi et al. |
| 2014/0277753 A1 | 9/2014 | Eiynk et al. |
| 2014/0298237 A1 | 10/2014 | Galu et al. |
| 2014/0372896 A1* | 12/2014 | Raman .................. G06F 3/0488 |
| | | 715/741 |
| 2015/0007308 A1 | 1/2015 | Mankowski |
| 2015/0029095 A1 | 1/2015 | Gomez et al. |
| 2015/0038072 A1 | 2/2015 | Cordier et al. |
| 2015/0046885 A1* | 2/2015 | Zhang .................. G06F 3/0481 |
| | | 715/863 |
| 2015/0067578 A1* | 3/2015 | Ryu .................... G06F 3/04883 |
| | | 715/781 |
| 2015/0072784 A1* | 3/2015 | Lee ........................ G06Q 50/10 |
| | | 463/31 |
| 2015/0121314 A1 | 4/2015 | Bombolowsky |
| 2015/0135129 A1* | 5/2015 | Kwon ................. G06F 3/04883 |
| | | 715/781 |
| 2015/0138142 A1 | 5/2015 | Liao et al. |

(56) References Cited

U.S. PATENT DOCUMENTS

| | | | |
|---|---|---|---|
| 2015/0153932 A1* | 6/2015 | Jiang | H04M 1/72522 715/835 |
| 2015/0169141 A1* | 6/2015 | Kim | G06F 3/0482 715/769 |
| 2015/0169216 A1* | 6/2015 | Cho | G06F 3/04883 715/764 |
| 2015/0169502 A1 | 6/2015 | Fox et al. | |
| 2015/0188970 A1* | 7/2015 | Kowshik | H04L 65/602 715/204 |
| 2015/0220182 A1 | 8/2015 | Avrahami et al. | |
| 2015/0294096 A1 | 10/2015 | Grigg et al. | |
| 2015/0355805 A1 | 12/2015 | Chandler et al. | |
| 2015/0365492 A1* | 12/2015 | Kalan | G06Q 10/0637 700/83 |
| 2016/0054851 A1 | 2/2016 | Kim et al. | |
| 2017/0039691 A1* | 2/2017 | Sugioka | G06K 9/4604 |
| 2017/0230378 A1 | 8/2017 | Bliss | |
| 2018/0267690 A1 | 9/2018 | Kemp et al. | |
| 2019/0095075 A1* | 3/2019 | Yang | G06F 21/36 |
| 2019/0174069 A1 | 6/2019 | Poindexter, Jr. | |

FOREIGN PATENT DOCUMENTS

| | | |
|---|---|---|
| CN | 203204640 U | 9/2013 |
| EP | 2 042 955 A1 | 4/2009 |
| EP | 2 416 308 A1 | 2/2012 |
| WO | WO-97/21204 A1 | 6/1997 |
| WO | 2015012789 A1 | 1/2015 |
| WO | WO-2015/012789 A1 | 1/2015 |

OTHER PUBLICATIONS

Lee, et al., "Access to an Automated Security System Using Gesture-Based Passwords", Network-Based Information Systems (NBiS), 2012 15 International Conference, 2012, 760-765.

SAE-BAE, et al., "Multitouch Gesture-Based Authentication", Information Forensics and Security, IEEE Transactions, 2014, 568-582.

Tsagaris, et al., "Methodology for finger gesture control of mechatronic systems", MECHATRONIKA, 2012, 1-6.

Wang, et al., "VirtualTouch: A finger glove to simulate touch screen commands", Sensors, 2012 IEEE, 2012, 1-4.

Copending U.S. Appl. No. 15/145,073, filed May 3, 2016, and the prosecution history thereof.

Copending U.S. Appl. No. 15/145,095, filed May 3, 2016, and the prosecution history thereof.

Decision on Rejection for Chinese Application No. 201480080514.0, dated Sep. 30, 2019.

European Search Report and Opinion issued in connection with related EP Application No. 16168865.0 dated Jul. 12, 2016.

European Search Report and Opinion issued in connection with related EP Application No. 16168865.0 dated Oct. 17, 2016.

Final Office Action issued in connection with related U.S. Appl. No. 14/713,467 dated Apr. 19, 2017.

First Office Action for Chinese Application No. 201480080514.0, dated Jun. 29, 2018.

International Preliminary Report on Patentability for Application No. PCT/US2014/069247, dated Jan. 10, 2017.

International Search Report and Written Opinion for Application No. PCT/US2014/069247, dated Jun. 23, 2015.

Niu, Yuan et al., "Gesture Authentication with Touch Input for Mobile Devices," Third International ICST Conference, MobiSec 2011, Aalborg, Denmark, May 17-19, 2011, pp. 13-24.

Non-Final Office Action issued in connection with related U.S. Appl. No. 14/713,467 dated Oct. 4, 2016.

Office Action, European patent application No. 14824987.3, dated Jul. 9, 2019.

Third Office Action for Chinese Application No. 201480080514.0, dated Apr. 12, 2019.

* cited by examiner

Sequence 1: Please define a first pattern in an associated quadrant
Quadrant [1202A]  Pattern [1202B]
Sequence 2: Please define a second pattern in an associated quadrant
Quadrant [1202C]  Pattern [1202D]
Sequence 3: Please define a third pattern in an associated quadrant
Quadrant [1202E]  Pattern [1202F]
FIG. 12
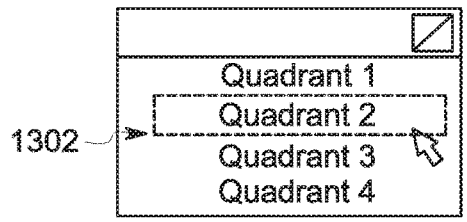
FIG. 13A
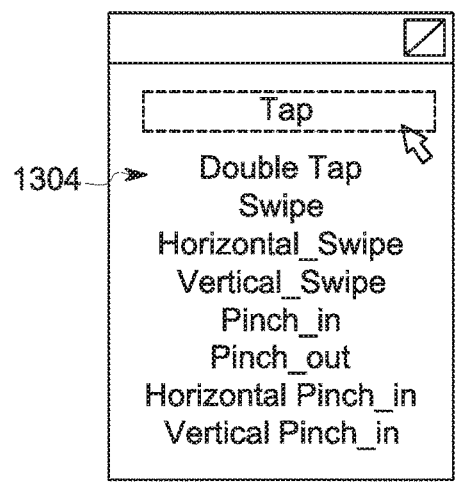
FIG. 13B

SYSTEM AND METHOD OF USING TOUCH INTERACTION BASED ON LOCATION OF TOUCH ON A TOUCH SCREEN

FIELD OF THE DISCLOSURE

Embodiments of the disclosure generally relate to controls of industrial systems, and more particularly methods and systems for managing security for a group of controllers.

BACKGROUND

In distributed industrial control systems, local controllers with human-machine interfaces (HMIs) may be placed near individual subsystems to which they provide associated control, management, supervision, and operation functions to the subsystem or groups thereof. Examples of industrial control applications include those in power plants, factories, refineries, power distribution sites, wind or solar farms, among others. Because of the harsh and tumultuous physical conditions associated with industrial environments, ruggedized HMI are used.

Secured operation is a requirement of industrial applications to safeguard against intrusion and disruption of the infrastructure and provided services. In addition, operation with lower spatial input resolution is also a requirement as gloves and protective gear are often used in such environments.

What are needed are devices, systems and methods that overcome challenges in the present art, some of which are described above.

SUMMARY

Exemplified herein are systems and methods to accept gesturing passwords and user commands on a touch-screen HMI (human-machine interface) device. The system and method uses a combination of tactile gestures that are each received at spatially-defined regions (e.g., quadrants) of the touch-screen.

In some embodiments, the combination of such tactile-gesture-patterns and spatially-defined regions (e.g., quadrant), as inputted to a touch-screen, are used as an authentication sequence to allow or enable access to control screens that manages operations of a nearby subsystem. The inputs facilitates the use of sequences of shapes and screen locations in combination with one another to form a gesturing password. Rather than using complex codes, the gesturing password facilitates a more intuitive means to access the device and also reduce the chance of an incorrect input, e.g., via touch-screen keyboard keys or pointing device. In addition, the input are received, in some embodiments, on a transparent screen that allows the underlying control screens to be viewed. This allows the control screens to remain locked thereby securing the control screens from sabotage or inadvertent operation, while allowing the underlying control notification and report to be viewed. In other embodiments, the control screen receives the input, but is configured to not invoke actions (e.g., being in a locked- or non-active state) on underlying input widgets until an authenticating input is provided.

In some embodiments, the combination of such tactile gestures and quadrant inputs are used as invocation sequence (as a shortcut) to invoke a command or access to a panel that may require several actions to be invoked. To this end, the tactile gestures and associated quadrant input facilitates user navigation and execution of programmable elements in a touch based device (i.e., a controller) without lengthy touch interaction sequence to execute a command/operation on the touch based device.

According to an aspect, a method of receiving a sequence of spatially- and pattern-defined touch inputs, at a graphical user interface, of a touch-screen input device, in an industrial automation system, to trigger an associated user interface command. The method includes presenting, by a processor, via a touch-screen display, a plurality of transparent widgets, each located at an area spanning a pre-defined quadrant of the presented display, wherein each transparent widget (e.g., an object generated and monitored for tactile input in the rendered display or a virtual region in the rendered display monitored for tactile input) is configurable to be associated with a user-interface (UI) function call (e.g., change zoom parameter of a presented screen of the display, navigate to a next presented screen, navigate to a previous presented screen).

The method includes, upon receipt, via the touch-screen display, of an input at a position corresponding to a transparent widget, determining, by the processor, a user-interface (UI) function call associated with i) a determined touch pattern, among a plurality of stored touch patterns, derived from the input and ii) a transparent widget location, among the pre-defined quadrants, derived from the received position.

The method includes, causing, by the processor, execution of the determined user-interface (UI) function call.

In some embodiments, the step of presenting a plurality of transparent widgets comprises presenting a number of transparent widgets selected from the group consisting of 2, 3, 4, 5, 6, 7, 8, 9, 10, 11, 12, 13, 14, 15, and 16.

In some embodiments, each of the plurality of transparent widgets has a pre-defined non-overlapping region among each of the neighboring transparent quadrants rendered on the presented display.

In some embodiments, each of the plurality of transparent widgets has an overlapping region with a neighboring transparent widget.

In some embodiments, the determined touch pattern comprises a contiguous pattern selected from the group consisting of a point, a line, an arc, and a polygonal shape (e.g., a box, a circle, a triangle, a parallelogram, a rectangle, a rhomboid, etc.).

In some embodiments, the determined touch pattern comprises two or more contiguous patterns, each selected from the group consisting of a point, a line, an arc and a polygonal shape (e.g., wherein the two or more continuous patterns, collectively, form a symbol, letter, or number, e.g., "=", "X", a double circle, etc. or a motion, e.g., "a swipe").

In some embodiments, the user-interface (UI) function call is associated with an operating-system function call.

In some embodiments, the user-interface (UI) function call is associated with a runtime-application function call.

In some embodiments, the user-interface (UI) function call is associated with presentation of an operating system configuration window.

In some embodiments, the method includes, upon receipt, via the touch-screen display, of a second input i) originating at a first position on the presented display associated with a first transparent widget presented at a first quadrant and ii) terminating at a second position on the presented display associated with a second transparent widget presented at a second quadrant, determining, by the processor, a second user-interface (UI) function call associated with i) a determined touch pattern, derived from the second input, and ii) transparent-widget pair locations, among the pre-defined quadrants, derived from the received positions; and causing, by the processor, execution of the second user-interface (UI) function call.

In some embodiments, the method includes, upon receipt, via the touch-screen display, of a third input having traversed across i) a first transparent widget presented at a first quadrant, ii) a second transparent widget presented at a second quadrant, and iii) a third transparent widget presented at a third quadrant, determining, by the processor, a third user-interface (UI) function call associated with i) a determined touch pattern, derived from the third input, and ii) at least three transparent widget locations, among the pre-defined quadrants, derived from the received positions; and causing, by the processor, execution of the third user-interface (UI) function call.

In some embodiments, the method includes presenting, by the processor, via the touch-screen display, a visual representation of a graphical element at a border region located between each neighbor transparent widgets among the plurality of transparent widgets.

In some embodiments, the method includes presenting, by the processor, via the touch-screen display, a visual representation of an indicia (e.g., textual label or a graphical symbol) for a given user-interface (UI) function call associated with a given transparent widget.

In some embodiments, each of the plurality of transparent widgets has a minimum transparent value (e.g., 0) associated with presentation of a transparent graphical element.

In some embodiments, at least one of the plurality of transparent widgets have a transparent value between a minimum transparent value (e.g., 0) and a maximum transparent value (e.g., 1) associated with presentation of a transparent graphical element.

In some embodiments, the plurality of transparent widgets comprise a first transparent widget and a second transparent widget, the first transparent widget having a first color value and the second transparent widget having a second color value, wherein the first color value is different from the second color value.

In some embodiments, the method includes presenting, by the processor, a visual representation of a configuration window, the configuration window having a plurality of selectable input fields, including a first selectable input field, a second selectable input field, and a third selectable input field, wherein the first selectable input field includes a list of one or more triggerable function calls selected from the group consisting of operating system user-interface function calls, run-time application function calls, and a combination thereof, wherein the second selectable input field includes a list of one or more quadrants associated with execution of the function calls selected in the first selectable input field, and wherein the third selectable input field includes a list of touch patterns, to be used in conjunction with the selected one or more quadrants selected in the second selectable input field, the selected touch pattern being associated with execution of the function calls selected in the first selectable input field.

In some embodiments, the selection from each of the plurality of selectable input fields, collectively defines a gesture-operation map.

According to another aspect, a system is disclosed (e.g., in an industrial automation system) that triggers executions of user interface commands, using spatially- and pattern-defined touch inputs received at a touch-screen display associated with the system. The system includes a touch-screen display; a processor operatively coupled to the touch-screen display; and a memory operatively coupled to the processor, the memory having instructions stored thereon, wherein the instructions, when executed by the processor, cause the processor to: present via the touch-screen display, a plurality of transparent widgets, each located at an area spanning a pre-defined quadrant of the presented display, wherein each transparent widget is associated with a user-interface (UI) function call (e.g., change zoom parameter of a presented screen of the display, navigate to a next presented screen, navigate to a previous presented screen); upon receipt, via the touch-screen display, of an input at a position corresponding to a transparent widget, determine a user-interface (UI) function call associated with i) a determined touch pattern, among a plurality of stored touch patterns, derived from the input and ii) a transparent widget location, among the pre-defined quadrants, derived from the received position; and cause execution of the determined user-interface (UI) function call.

According to another aspect, a non-transitory computer-readable medium is disclosed for execution on a computing device having a touch-screen display, to trigger execution of user interface commands, using spatially- and pattern-defined inputs received at the touch-screen display, the computer-readable medium having instructions stored thereon, wherein the instructions, when executed by the processor, cause the processor to: present via the touch-screen display, a plurality of transparent widgets, each located at an area spanning a pre-defined quadrant of the presented display, wherein each transparent widget is associated with a user-interface (UI) function call (e.g., change zoom parameter of a presented screen of the display, navigate to a next presented screen, navigate to a previous presented screen); upon receipt, via the touch-screen display, of an input at a position corresponding to a transparent widget, determine a user-interface (UI) function call associated with i) a determined touch pattern, among a plurality of stored touch patterns, derived from the input and ii) a transparent widget location, among the pre-defined quadrants, derived from the received position; and cause execution of the determined user-interface (UI) function call.

According to another aspect, a method is disclosed of receiving spatially- and pattern-defined touch inputs, at a graphical user interface, of a touch-screen input device, in an industrial automation system, to trigger an associated user interface command. The method includes presenting, by a processor, via a touch-screen display, a plurality of widgets for a control application in an industrial automation system, wherein each of the plurality of widgets is associated with a user-interface (UI) function call, wherein the control application maintains a virtual map (e.g., a gesture-operation map) defining a plurality of pre-defined quadrants over the presented display; upon receipt, via the touch-screen display, of an input at a position corresponding to a given pre-defined quadrant, determining, by the processor, a user-interface (UI) function call associated with i) a determined touch pattern, among a plurality of stored touch patterns, derived from the input and ii) a quadrant location associated with the given pre-defined quadrant; and causing, by the processor, execution of the determined user-interface (UI) function call.

BRIEF DESCRIPTION OF THE DRAWINGS

The components in the drawings are not necessarily to scale relative to each other and like reference numerals designate corresponding parts throughout the several views:

FIGS. 9, 10, and 11, depict diagrams of a user interface to create a gesturing password, in accordance with an illustrative embodiment.

FIGS. 12 and 13, comprising FIGS. 12, 13A, and 13B, depict diagrams of a user interface to create a gesturing password, in accordance with another illustrative embodiment.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Figure 1:
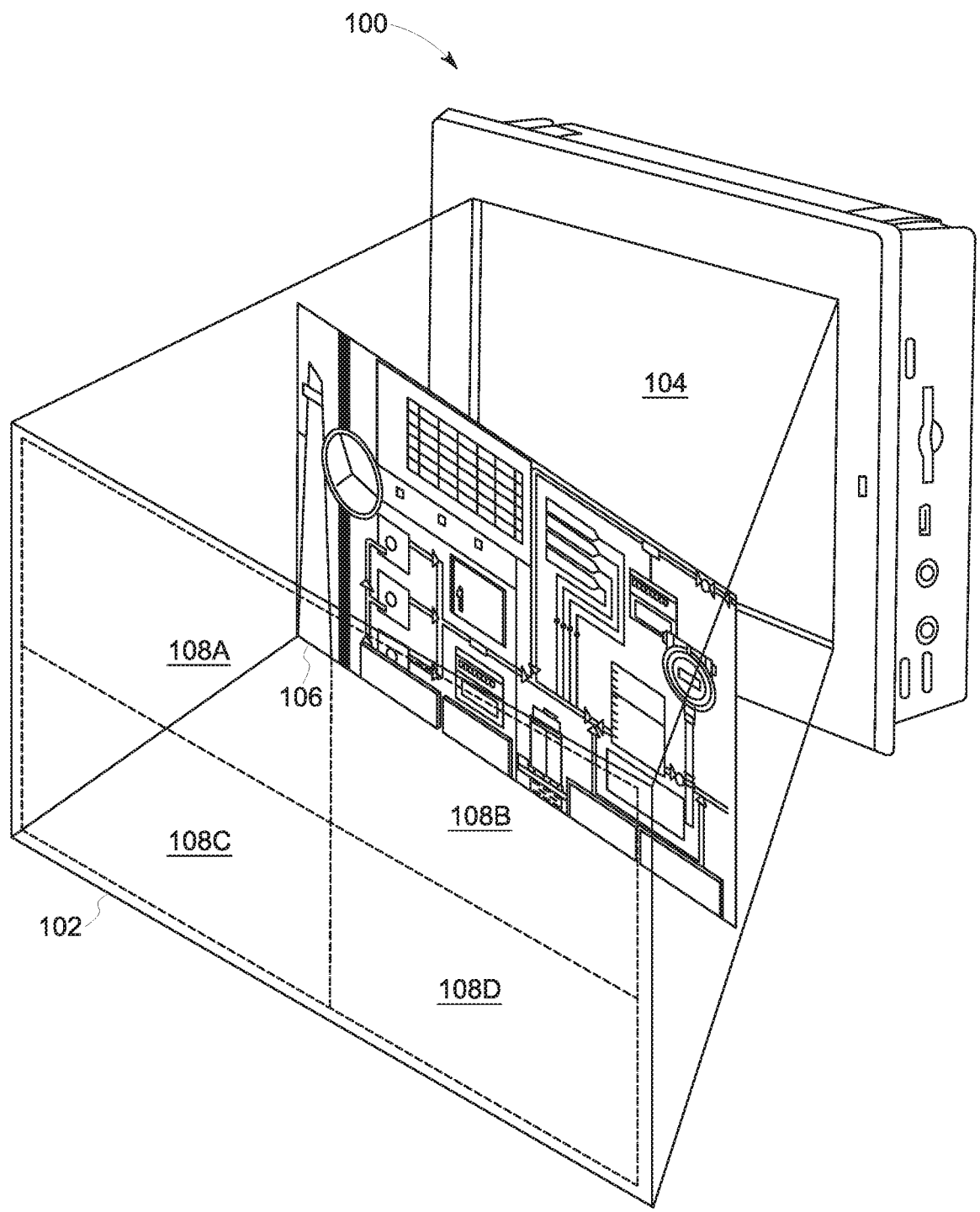
FIG. 1 depicts an example graphical user interface (GUI) configured to receive spatially- and pattern-defined touch input, in accordance with an illustrative embodiment.

FIG. 1 depicts an example graphical user interface (GUI) configured to receive spatially- and pattern-defined touch input, in accordance with an illustrative embodiment, for example, for use in association with an industrial automation system.

In some embodiments, the industrial automation system includes programmable logic controllers (PLCs), supervisory control and data acquisition (SCADA) systems, and programmable automation controllers (PACs), safety instrumented systems (SISs), and the like, (collectively forming a distributed I/O system) for controlling power generation systems and/or machinery in an industrial automation application. One or more of the PLC, SCADA, and PAC controllers may be configurable to receive input-output modules, as well as submodules, that provides input and output channels to controllable elements (e.g., sensors and actuators) in the system. In some embodiments, the PLC, SCADA, and PAC controllers, and network directing elements (e.g., switches and routers) connected thereto, are configured to provide, over a communication link, to components (e.g., the development workspace) in the network, hardware description data and device configuration data associated with the controllers. In some embodiments, the communication link is provided over industrial protocols, such as Profinet, Profibus, InterCAD, FieldBus, and the like.

The exemplified system associates spatial regions of a touch screen as virtual quadrants that receives a pattern submitted thereon as a gesturing password that is a combination of gestures applied on each of the quadrants. In FIG. 1, a computing device 100 generates, via an application, an input screen 102 (e.g., a prompt window), via the graphical user interface 104, that renders over or defined within a control screen 106. That is, the input screen 102, in some embodiments, includes a separate layer or panel that is transparent and generated over a live control screen 106 (that is, an input received at the control screen causes widgets therein to be invoked). The separate layer or panel, in some embodiments, is generated via an operation system service or via an application executing in parallel or in conjunction with the control application associated with the screen.

In other embodiments, this input screen 102 is replicated in the control screen 106 in that the control screen 106 limits acceptance of inputs for authentication purposes, and input-based widgets associated with the control screen 106 are configured to not to respond to such inputs until a lock flag, or the like (e.g., a non-active state flag), is modified following the authentication input. In some embodiments, a virtual map is maintained in conjunction with the control screen 106 in that the map is used as an input to a second program that operates in parallel to a first program that generated the control screen 106.

Referring still to FIG. 1, the input screen 102 is divided into multiple zones, each configured to receive inputs at multiple associated spatial regions 108 (shown as regions 108a, 108b, 108c, and 108d) to which the combination of each input pattern at respective associated spatial regions, collectively, define a sequence of spatial-specific pattern.

Example Spatially- and Pattern-Defined Touch Input Sequences

FIGS. 2-6, comprising FIGS. 2, 3, 4, 5, and 6, each depicts an example spatially- and pattern-defined touch input, in accordance with an illustrative embodiment.

Figure 2:
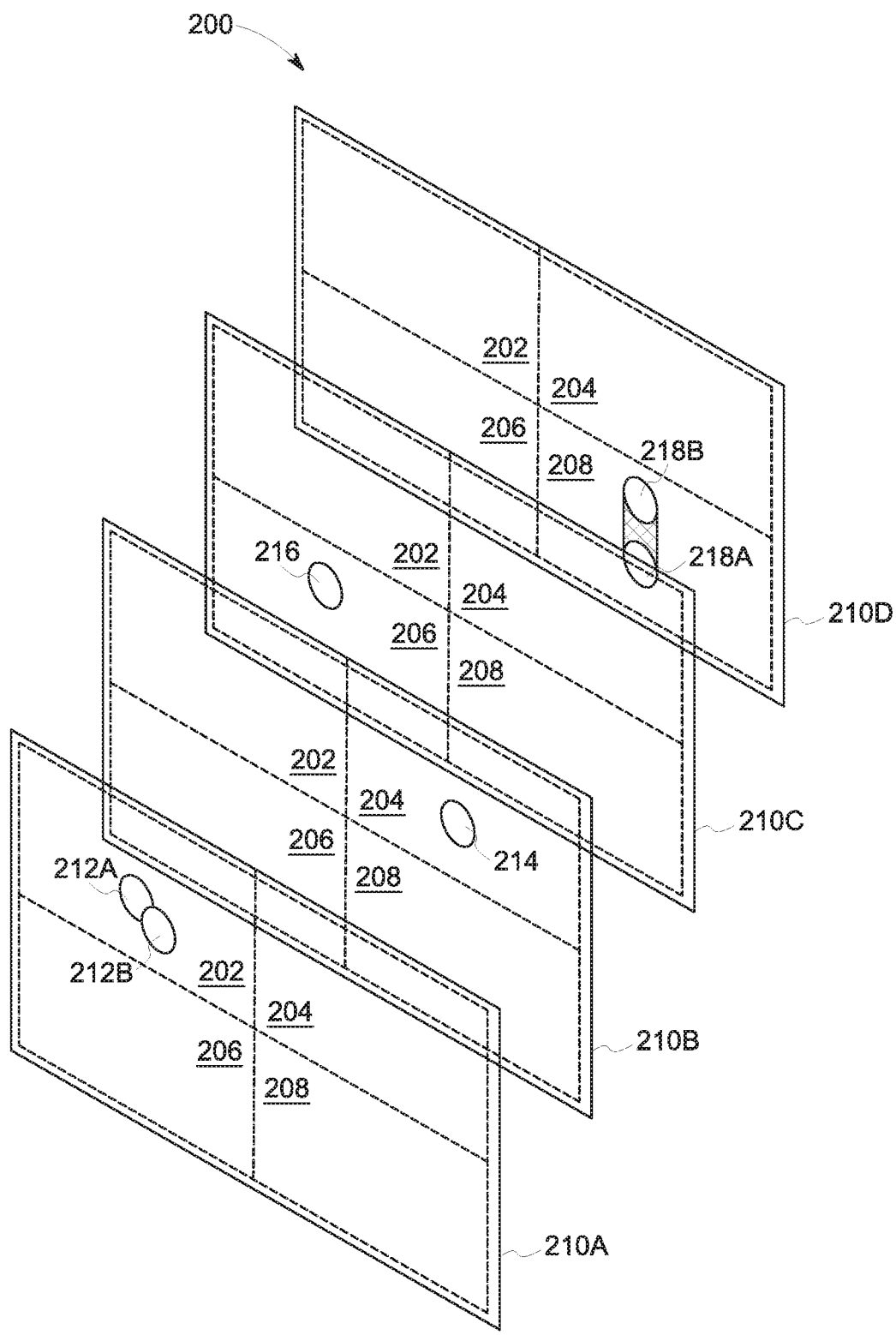
FIGS. 2-6, comprising FIGS. 2, 3, 4, 5, and 6, each depicts an example spatially- and pattern-defined touch input, in accordance with an illustrative embodiment.

In FIG. 2, an example spatially- and pattern-defined touch input sequence 200 includes a "double tap" in a first quadrant of the GUI followed by a "single tap" in the second quadrant followed by a "single tap" in a third quadrant followed by a "swipe" in the fourth quadrant. As shown in FIG. 2, the "double tap" in the first quadrant includes two consecutive point-based inputs (shown as 212a and 212b) received at an upper-left region 202 (quadrant 1). The input coordinates 212a, 212b each registers as a narrow field within a small variation from each other (e.g., the spatial median between each of the two inputs are less than one-half the size of narrow field) and each are received within a pre-defined time from one another (e.g., less than 0.5 second). In sequence 210b, a single point-based input (shown as 214) is received at an upper-right region 204 (quadrant 2). In sequence 210c, a single point-based input (shown as 216) is received at a lower-left region 206 (quadrant 3). In sequence 210d, a multi-point-based input (shown as 218) is received at a lower-right region 208 (quadrant 3); the multi-point-based input includes multiple input points received as a line in which all of the points are received within a defined-time (e.g., less than 0.5 second). The beginning and end points are shown as points 218a, 218b.

As shown in FIG. 2, the specific location of the input coordinates for a double tap is not used to exclude a given input as meeting the input pattern so long as the inputs are received in the specific region (i.e., quadrant) of the screen. In addition, the specific angle, specific line length for a swipe is not used in the determination. For a swipe action, only a minimum length threshold and a time parameter to receive the inputs are used, in some embodiments.

In some embodiments, the geometrically determined center of the narrow fields from the inputs are used to determine the pattern.

This example spatially- and pattern-defined touch input sequence of FIG. 2, and other figures disclosed herein, are received, via the GUI, of a computing device. The computing device has a memory having instructions stored thereon, wherein when executed by a processor, cause the processor to present control screen on the GUI, receive inputs from the same GUI, and determine a spatially- and pattern-defined touch input pattern using the inputs. The instructions, when executed by the processor, cause the processor to receive multiple of these spatially- and pattern-defined touch input patterns, which collectively form the spatially- and pattern-defined touch input sequence that is compared to a pre-defined set of one or more pattern-defined touch input sequences that would provide authentication to the control screen.

In other embodiments, the pattern-defined touch input sequence is compared to a pre-defined set of one or more pattern-defined touch input sequences to invoke an operating system event or an application action, for example, invoke execution of a command or widget associated with the application, invoke execution of an application, and invoke opening of an operation system or application based control menu or panel.

The number of spatially- and pattern-defined touch input sequences to form a gesturing password, in some embodiments, is between 1 and 10 sequences, including 1, 2, 3, 4, 5, 6, 7, 8, 9, and 10. In some embodiments, the preferred number of sequences for a given gesturing password is less than 6. In some embodiments, a gesturing password may include more than 10 spatially- and pattern-defined touch input sequences.

Quadrants as used herein refers to any of such divided regions of the touch screen and such division can be in 2, 3, 4, 5, 6, 7, 8, 9, 10, 11, or 12 divisions. Quadrants are also referred to herein as input regions.

In some embodiments, the GUI receives input via a touch class, e.g., the system.windows.input class in PresentationCore.dll (for Windows). In some embodiments, the GUI receives via libinput library in Linux. In some embodiments, the GUI may operate in conjunction with a multitouch gesture program such as Touchegg, or other multitouch gesture programs, that runs as a user in the background, and adds multi-touch support to the window managers.

Example Simultaneous Multi-Input Patterns

In addition to "swipe", "double tap", and "single tap" input patterns, other spatially- and pattern-defined touch input patterns that may be maintained in memory and compared thereto by the processor include "pinch-in" action, "pinch-out" action. In some embodiments, the GUI may be configured to receive and determine a "vertical line" input pattern or a "horizontal line" input pattern. "Vertical line" and "horizontal line" input patterns may have lax, or not have, an input time requirement—rather than an angle input tolerance and/or variation tolerance requirement.

Figure 3:
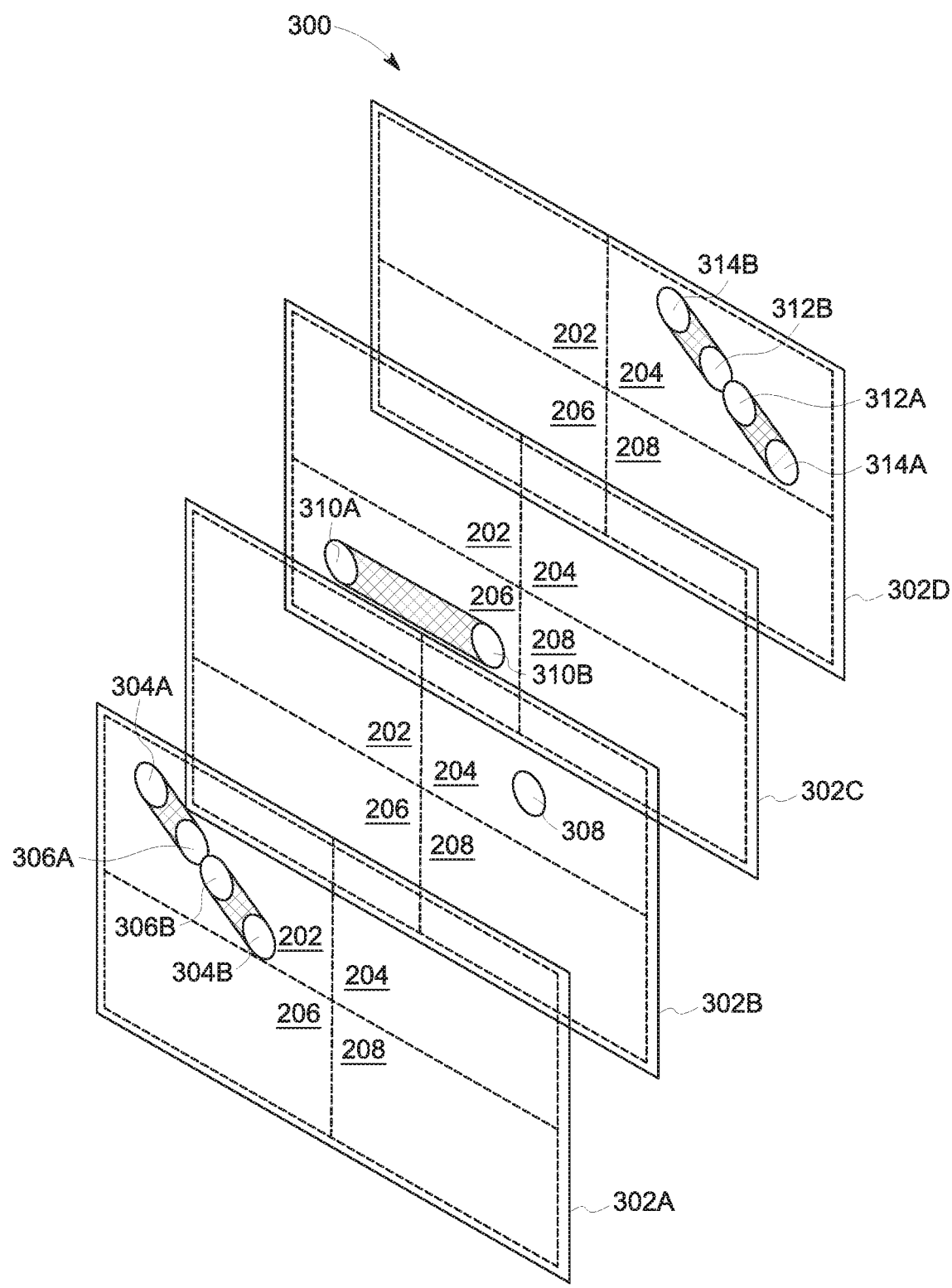

In FIG. 3, an example spatially- and pattern-defined touch input sequence 300 includes a "pinch-in" in the first quadrant followed by a "single tap" in the second quadrant followed by a "swipe" in the third quadrant followed by a "pinch-out" in the fourth quadrant. As shown in FIG. 3, the "pinch-in" pattern received, in the first sequence 302a, in the first quadrant, includes multiple input points received as two lines that converged to each other. In some embodiments, each of the lines includes a first entry point (shown as 304a and 304b) and ends at exit points (shown as 306a and 306b, respectively). The angle of the lines, in some embodiments, are not used for the determination of the pattern. In some embodiments, subclasses of the pinch-in and pinch-out patterns, such as horizontal pinch-in/out and vertical pinch-in/out, use angles of the lines as a criterion in the determination of a pattern. In the second sequence 302b, a single point-based input 308, similar to the description provided in relation to FIG. 2, is received at the upper-right region (Quadrant 2). In the third sequence 302c, the multi-point-based input corresponding to a "swipe", as described in relation to FIG. 2, is received at the lower-left region (Quadrant 3); the multi-point-based input includes multiple input points received as a line in which all of the points are received within a defined-time (e.g., less than 0.5 second). The beginning and end points are shown as points 310a, 310b. In the fourth sequence 302d, the "pinch-out" pattern received, in the second quadrant, includes multiple input points received as two lines that diverged from each other. In some embodiments, each of the lines includes a first entry point (shown as 312a and 312b) and ends at exit points (shown as 314a and 314b, respectively). The angle of the lines, in some embodiments, are not used for the determination of the pattern.

Example Multi-Quadrant Patterns

In addition, spatially- and pattern-defined touch input patterns that are maintained in memory and compared thereto by the processor may include patterns that extend across multiple regions and geometrically-relevant patterns (e.g., accounting for angles of a path defined by the respective inputs).

Figure 4:
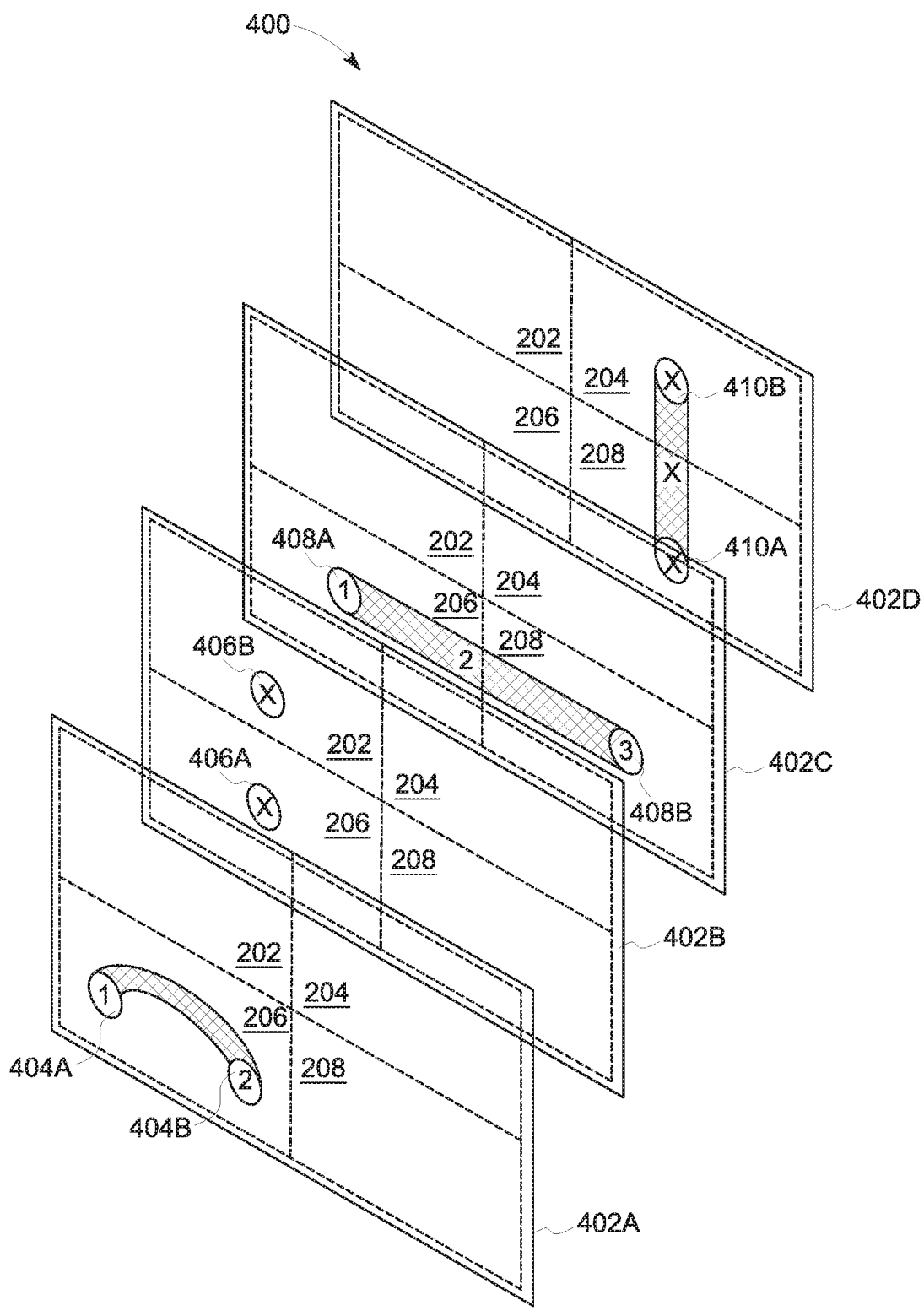

In FIG. 4, an example spatially- and pattern-defined touch input sequence includes a curved-line input, a multi-point multi-quadrant input, a multi-quadrant swipe action, and a multi-quadrant line symbol. In FIG. 4, an example spatially- and pattern-defined touch input sequence 400 includes a "curved line" in the third quadrant followed by a "tap-hold-and-tap" in the first and third quadrant followed by a horizontal "intra-quadrant swipe" between the third and fourth quadrant followed by a vertical "intra-quadrant swipe" in between the fourth and second quadrant. As shown in FIG. 4, the "curved line" pattern received, in the first sequence 402a, at the third quadrant (e.g., 206), includes multiple input points received as a curved line in which all of the points are received within a defined-time (e.g., less than 0.5 second). The beginning and end points are shown as points 404a, 404b.

In the second sequence 402b, a "tap-hold-and-tap" input is received at the first and third quadrant. The "tap-hold-and-tap" pattern includes a first input, say input 406a, at one of two pre-defined points. While the first input 406a is held, a second input 406b is received. There are generally no time limit, in some embodiments, between receipt of the first input 406a and the second input 406b. In other embodiments, a time limit (e.g., 2 or 3 seconds) for receipt of the first input 406a and the second input 406b is specified. As shown in FIG. 4, the "tap-hold-and-tap" pattern may specify an order-agnostic input among the first and second inputs. That is, to have a valid match, either inputs (e.g., 406a or 406b) can be received first followed by the corresponding inputs.

In the third sequence 402c, a horizontal "intra-quadrant swipe" between the third and fourth quadrant is received. The horizontal "intra-quadrant swipe" pattern includes an entry input 408a at a first quadrant (as shown here, Quadrant 3), and the input is maintained between the entry input 408a at the entry quadrant to an exit input 408b at an exit quadrant (shown as Quadrant 4). As shown in FIG. 4, the pattern specifies an order for the entry and exit input. To this end, inputs that are received in the opposite order do not match that pattern.

In the fourth sequence 402d, a vertical "intra-quadrant swipe" between the fourth and second quadrant is received at the third and fourth quadrant. Similar to a horizontal "intra-quadrant swipe", as discussed in relation to sequence 402c, the vertical "intra-quadrant swipe" pattern includes an entry input 410a at a first quadrant (as shown here, Quadrant 3), and the input is maintained between the entry input 410a at the entry quadrant to an exit input 410b at an exit quadrant (shown as Quadrant 4). As shown in FIG. 4, the pattern specifies an order-agnostic input among the entry and exit inputs. That is, to have a valid match, either inputs (e.g., 410a or 410b) can be received first followed by the corresponding inputs.

Example Shape and Symbol Patterns

In addition, spatially- and pattern-defined touch input patterns that are maintained in memory and compared thereto by the processor may include shaped patterns (e.g., box, circle, triangle) and/or symbols (e.g., alpha-numerical symbols and various known symbols).

Figure 5:
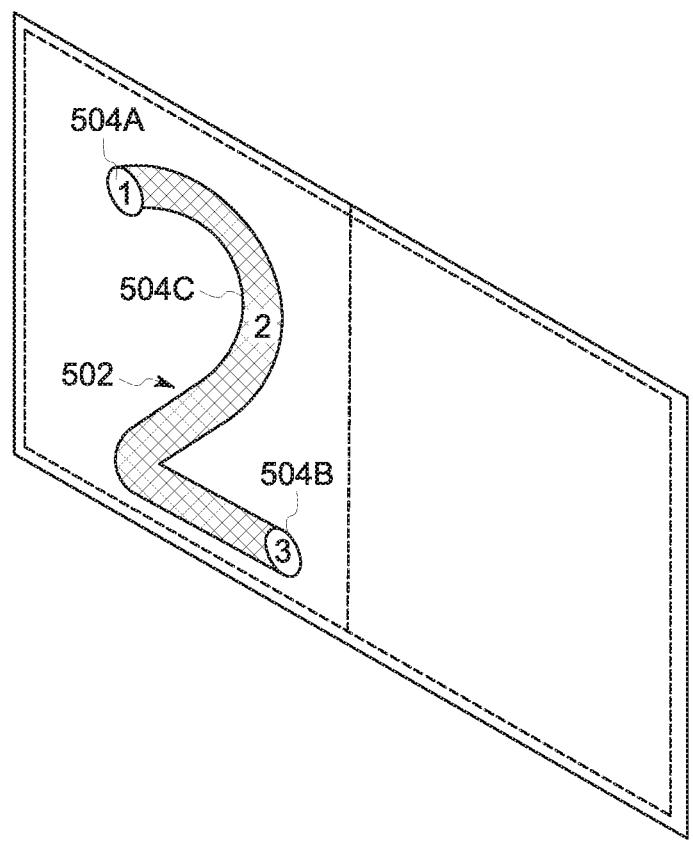
Figure 6:
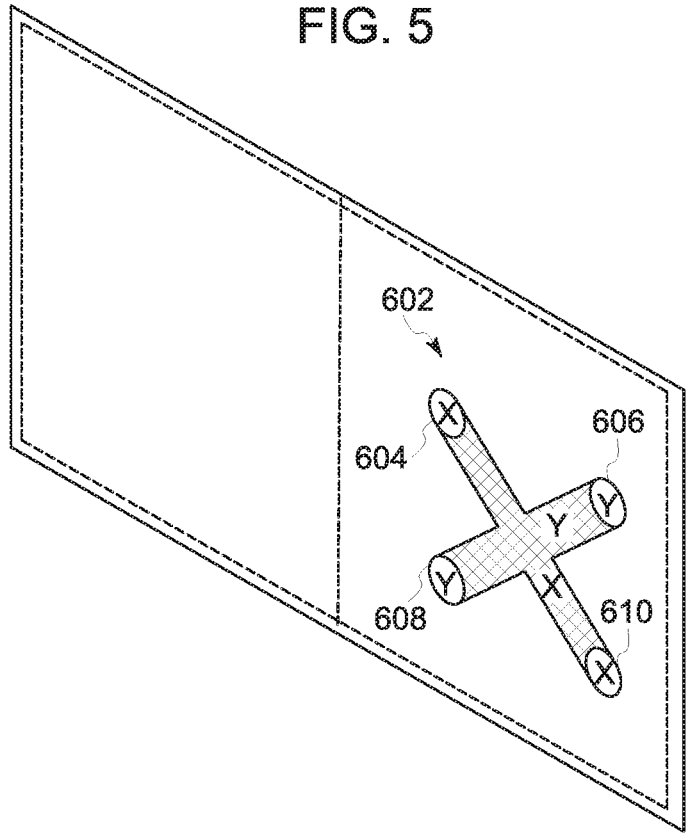

In FIGS. 5 and 6, an example spatially- and pattern-defined touch input sequence includes a symbol (e.g., an alpha-numerical symbol). In some embodiments, the symbol is defined geometrically and by stroke orders.

As shown in FIG. 5, a shape 502 corresponding to the number "2" is used as an example pattern. The shape 502 includes an entry point 504a, an exit point 504b, and a plurality of points (shown as 504c) that corresponds to the intended symbol shape.

Figure 7A:
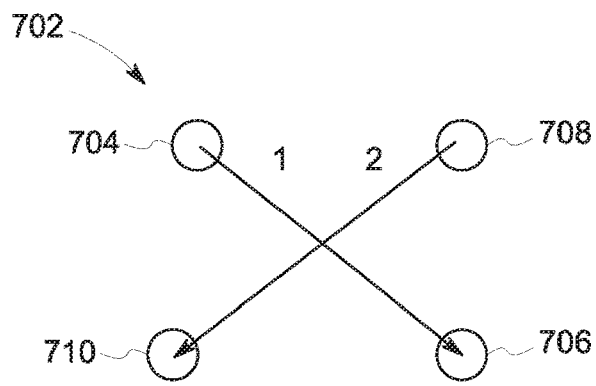
FIG. 7, comprising panels 7a, 7b, 7c, 7d, 7e, 7f, 7g, and 7h, illustrates example symbol patterns that include stroke ordering.
Figure 7B:
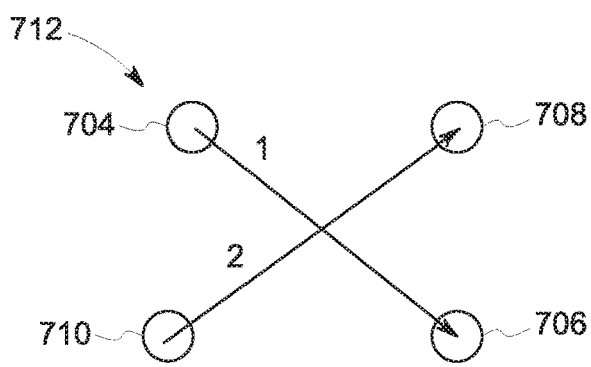
Figure 7C:
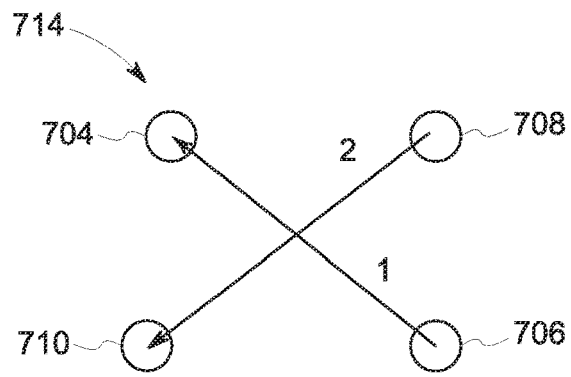
Figure 7D:
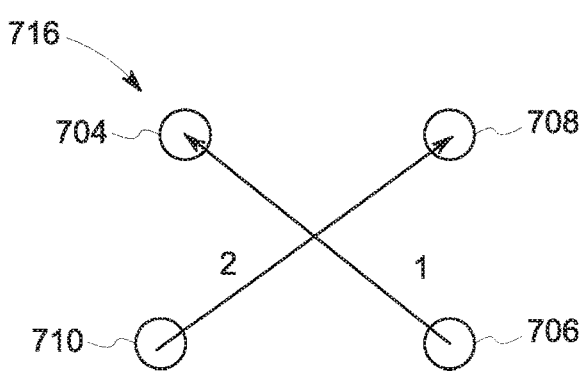
Figure 7E:
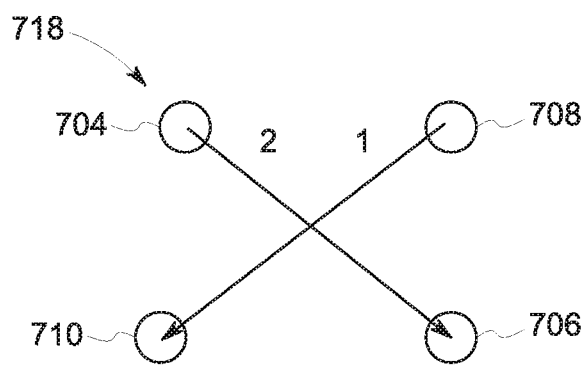
Figure 7F:
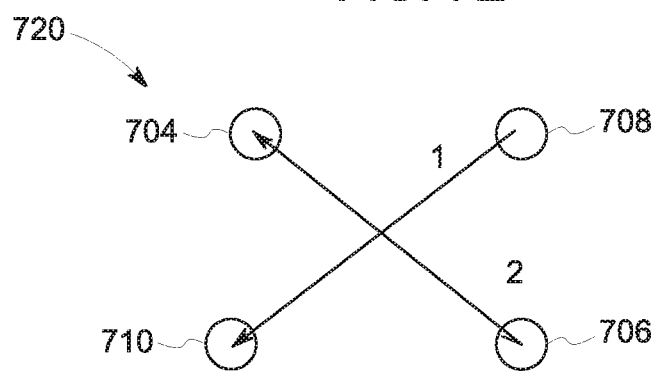
Figure 7G:
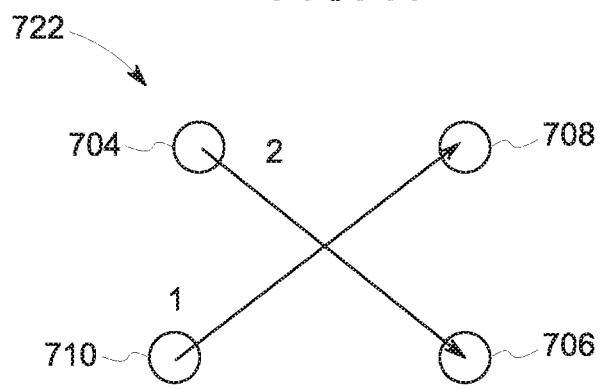
Figure 7H:
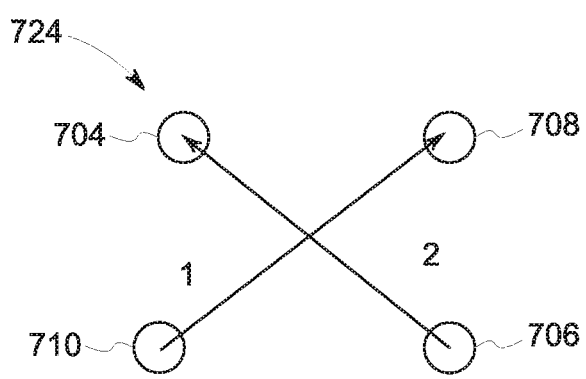

As shown in FIG. 6, a shape 602 corresponding to the letter "x" is used as a pattern. In some embodiments, the pattern is specified based on stroke sequences (i.e., starting point). That is, the entry and exit points have to match a pre-defined definition of the pattern. FIG. 7, comprising panels 7a, 7b, 7c, 7d, 7e, 7f, 7g, and 7h, illustrates example symbol patterns that include stroke ordering. Stoke ordering increases the number of permutations of a given symbol. A symbol that has 2 strokes (e.g., "x", "4") have 8 permutations based on starting points of each strokes—thereby allowing single symbols to provide a strong gesturing password. For example, as shown in FIG. 7A, a first pattern 702 for a symbol "x" includes a first entry point 704 and a first exit point 706 followed by a second entry point 708 and a second exit point 710. A second, and different, pattern 712 also includes a first entry point 704 and a first exit point 706, but now, followed by a second entry point 710 and a second exit point 708. A third, and different, pattern 714 includes a first entry point 706 and a first exit point 704 followed by a second entry point 708 and a second exit point 710. A fourth, and different, pattern 716 includes a first entry point 706 and a first exit point 704 followed by a second entry point 710 and a second exit point 708. A fifth, and different, pattern 718 includes a first entry point 708 and a first exit point 710 followed by a second entry point 704 and a second exit point 706. A sixth, and different, pattern 720 includes a first entry point 708 and a first exit point 710 followed by a second entry point 706 and a second exit point 704. A seventh, and different, pattern 722 includes a first entry point 710 and a first exit point 708 followed by a second entry point 704 and a second exit point 706. A eighth, and different, pattern 724 includes a first entry point 710 and a first exit point 708 followed by a second entry point 706 and a second exit point 704.

It should be appreciated that other symbols in various languages and fields (e.g., mathematical symbols) may be used as a pattern. Different version of the symbols (e.g., capitalized versus non-capitalized versions; script versus non-script; stroke ordering, number of strokes, and font types) may be used without departing from the spirit of the exemplified embodiments.

Gesturing Password

According to an embodiment, the multiple spatially- and pattern-defined touch inputs are received via the transparent input screen to form an authentication pattern (also referred herein to as a gesturing password and a touch-based password). The gesturing password allows an operator of a control system operating in an industrial environment to provide an authentication input to a HMI of the control system where the input has a high-number of permutations to be securable and has a high rate of input accuracy (as, for example, compared to touch keyboards). The HMI system receives a pattern (e.g., a point, a straight line, a curved line, and an alpha-numerical symbol) that is spatially relevant—that is, the pattern is received in conjunction, and associated, with one of multiple regions of the touch screen. The combination of each pattern instance and the respective region of that instance, and the sequence of these combinations provide a high number of unique gesturing passwords.

In some embodiments, the HMI of the control system is configured to present, via the touch-screen display, a visual representation of a graphical element at a border region between each neighbor transparent widgets among the plurality of transparent widgets.

Figure 8:
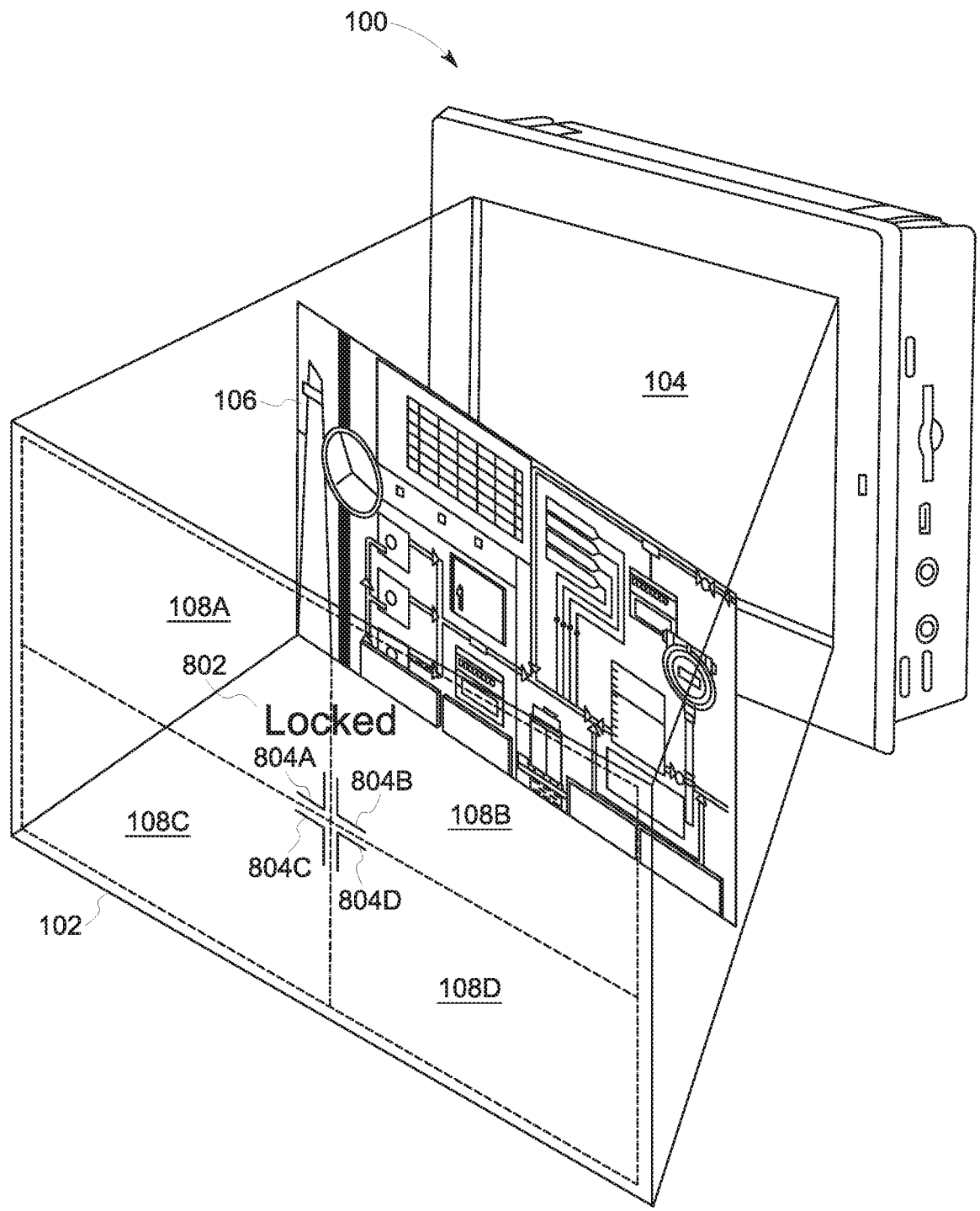
FIG. 8 depicts an example graphical user interface (GUI) configured to receive spatially- and pattern-defined touch input, in accordance with another illustrative embodiment.

As shown in FIG. 8, the computing device 100 generates, via the application, the input screen 102, via the graphical user interface 104, that renders over or defined within a control screen 106. In addition, the input screen 102 includes a graphical element 802 (shown as a text) to indicate that the control screen 106 is "locked" and authentication inputs in the form of the gesturing password is required. In addition, in some embodiments, the input screen 102 includes graphical elements 804 (shown as 804*a*, 804*b*, 804*b*, and 804*d*) to visually present boundaries for each respective quadrant and/or regions (shown as 108*a*, 108*b*, 108*c*, and 108*d*).

In some embodiments, the input screen 102 includes a graphical element to indicate a valid or invalid pattern sequence having been received by the system (e.g., via text, via a flashing color, etc.).

In some embodiments, the input screen 102 indicates (e.g., via text or via flashing colors) that an individual pattern is received.

Process to Define Gesturing Password by Creating a Gesture-Operation Map

Figure 9:
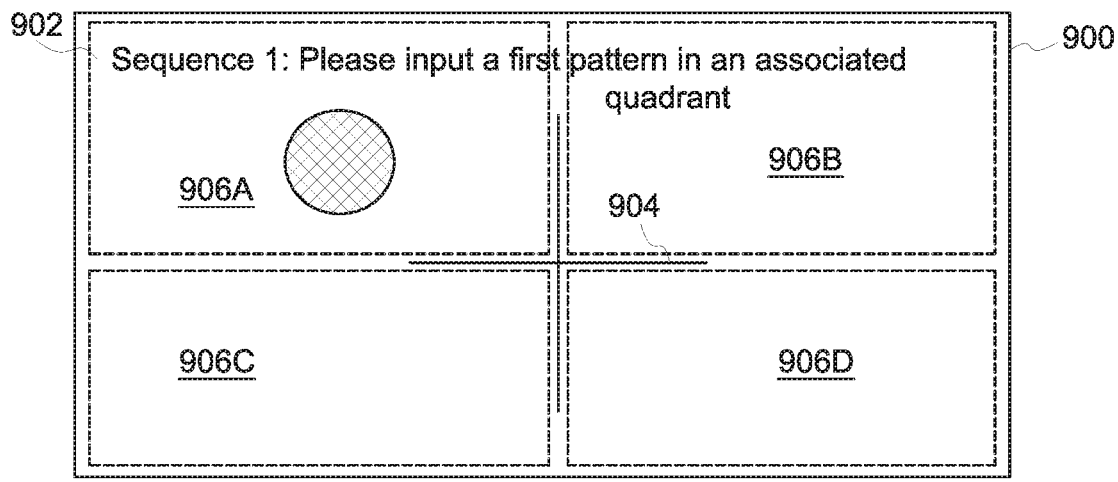
FIGS. 9-11, comprising
Figure 10:
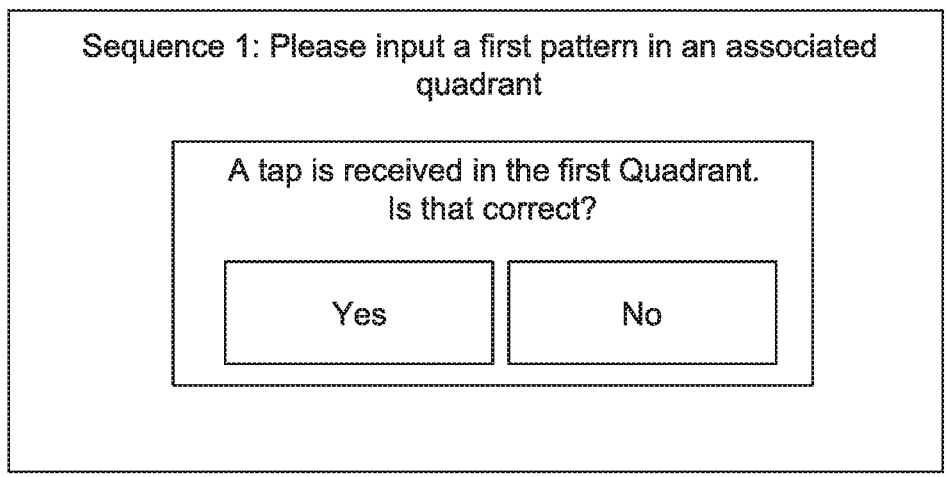
Figure 11:
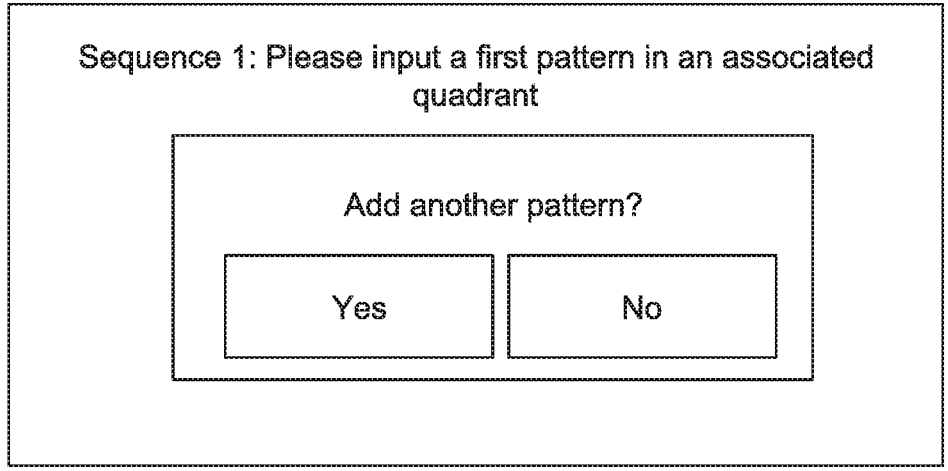

FIGS. 9-11, comprising FIGS. 9, 10, and 11, depict diagrams of a user interface to create a gesturing password, in accordance with an illustrative embodiment.

In FIG. 9, a user interface 900 (i.e., a dialog box or a screen) is presented to receive inputs from a user. The user interface 900 includes text 902 to prompt the operator to provide a first pattern in an associated quadrant. In some embodiments, the user interface 900 is configured to receive the pattern across one or more quadrants. As shown in FIG. 9, the user interface 900 renders a border 904 that defines the boundaries of each of the spatially-defined regions (i.e., referred to in this example as quadrants and shown as regions 906*a*, 906*b*, 90*c*, and 906*d*).

In FIG. 10, upon receipt of an input that matches to one of a plurality of gesture maps stored in a collection of gesture maps, the user interface 900 prompts the operator to confirm the received pattern and quadrant definition. Where multiple patterns are recognized, the user interface 900 may list all the recognized patterns and prompt the operator to select the intended pattern. In some embodiments, the user interface 900 may list all the recognized patterns and prompt the operator confirm that any and all of such recognized patterns constitute as a matched pattern. To this end, the GUI can use one of multiple patterns (i.e., like patterns) for a specific sequence in the gesturing password.

In FIG. 11, upon receipt of a confirmation of a pattern, the user interface 900 prompts the operator to add another gesturing-pattern and associated-touch-screen-region combination to the gesturing password or to complete and save the gesturing password. Upon selection of that a gesturing password has been completed, the user interface may display a textual description of the gesturing password and prompt the user to re-input the gesturing password. An example of a textual description, corresponding the gesturing password and gesturing map as shown in FIG. 2, can be "DOUBLE_TAP in Quadrant 1 [action 1]; then a TAP in Quadrant 2 [action 2]; then a TAP in Quadrant 3 [action 3]; followed by a SWIPE in Quadrant 4 [action 4]."

FIGS. 12 and 13, comprising FIGS. 12, 13A, and 13B, depict diagrams of a user interface to create a gesturing password, in accordance with another illustrative embodiment.

In FIG. 12, a user interface 1200 (i.e., a dialog box or a screen) is presented to receive inputs from a user. The user interface 1200 includes input widgets 1202 (shown as drop-down box 1202*a*, 1202*b*, 1202*c*, 1202*d*, 1202*e*, and 1202*f*) to receive (and, in some embodiments, prompt) the operator for a spatially- and pattern-defined touch input sequence. As shown in FIG. 12, the user interface 1200 prompts the user for a spatially- and pattern-defined touch input sequence comprising of three spatially- and pattern-defined touch input patterns, in which each pattern is defined by a region (shown as Quadrant 1202*a*, 1202*c*, and 1202*e*) and a pattern (shown as pattern 1202*b*, 1202*d*, and 1202*f*). In some embodiments, the GUI prompts the operator for a number of pattern-defined touch input sequence that defines a given gesturing password. To which, upon selection of a number, the GUI generates a specific number of sequence inputs (as shown in FIG. 12). In some embodiments, the GUI includes a widget to add additional sequence to the gesturing password.

In other embodiments, the GUI presents a dialog box or screen that is configured to present a default number of sequence inputs (e.g., 4). Each sequence input (comprising corresponding quadrant and pattern fields, e.g., 1202*a* and 1202*b*) may have a default value of "none", which may be modified by the operator to define a given sequence. The GUI may include a widget to add additional sequence to the gesturing password.

FIG. 13A and FIG. 13B each depicts diagrams of example drop-down menus associated with the respective quadrant and pattern fields. In FIG. 13A, the drop-down menu 1302 provides visual representation of a list four regions shown as "Quadrant 1", "Quadrant 2", "Quadrant 3", and "Quadrant 4". In FIG. 13B, the drop-down menu 1304 provide visual representation of a list of pattern-defined touch input patterns. The list shown are merely illustrative and not intended to be exhaustive. Other patterns, for example, those described in relation to FIGS. 2, 3, 4, 5, 6, and 7, among others, may be used without departing from the spirit of the disclosure.

Process to Receive and Use Gesturing Passwords

Figure 14:
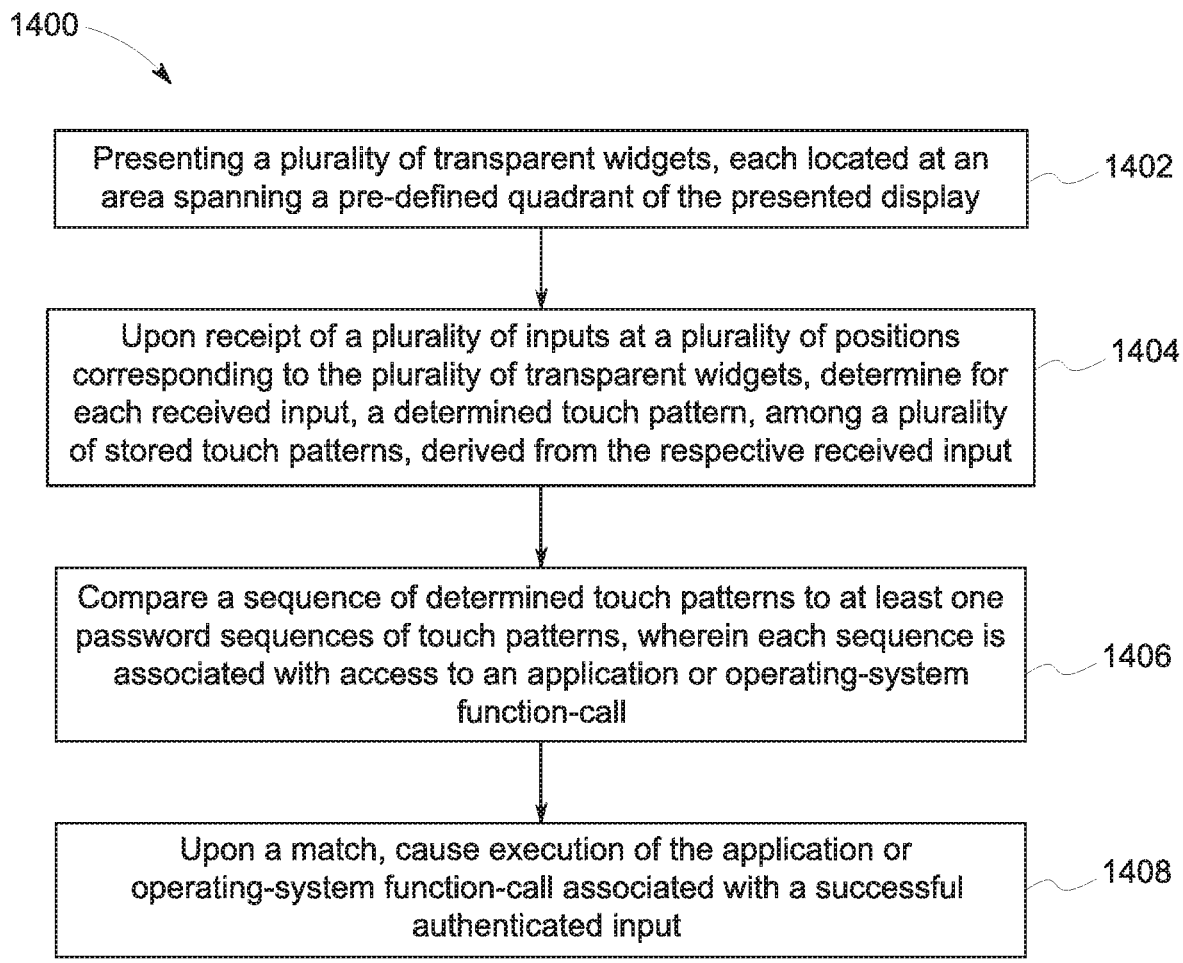
FIG. 14 depicts a method of receiving a sequence of spatially- and pattern-defined touch inputs, at a graphical user interface, of a touch-screen input device, in an industrial automation system, as a touch-based password for an operating system or an application executing on the device.

FIG. 14 depicts a method 1400 of receiving a sequence of spatially- and pattern-defined touch inputs, at a graphical user interface, of a touch-screen input device, in an industrial automation system, as a touch-based password for an operating system or an application executing on the device. FIG. 14 is described in relation to FIGS. 1 and 8.

The method 1400, in step 1402, includes presenting, by a processor, via a touch-screen display (e.g., 104) of the touch-screen input device (e.g., 100), a plurality of transparent widgets (e.g., an object (e.g., 108a, 108b, 108c, and 108d) generated and monitored for tactile input in the rendered display or a virtual region in the rendered display monitored for tactile input), each located at an area spanning a pre-defined quadrant of the presented display (e.g., 104).

The method 1400, in step 1404, includes, upon receipt, via the touch-screen display, of a plurality of inputs (e.g., sequences 210a-210d, 302a-302d, 402a-402d, 502, and 602, shown in FIGS. 2-6) at a plurality of positions (e.g., 202, 204, 206, 208) corresponding to the plurality of transparent widgets, determining, by the processor, for each received input, a determined touch pattern, among a plurality of stored touch patterns, derived from the respective received input.

The method 1400, in step 1406, includes comparing, by the processor, a sequence of determined touch patterns to at least one password sequences of touch patterns, wherein each sequence is associated with access to an application or operating-system function-call. In some embodiments, a logic monitors and interprets the gesture applied at a specific location. The logic may compare, following a pre-process operation that determines a path that is associated with the inputs, the determined path to a set of gesture maps, each associated with a given pattern. Multiple gesture maps may be associated with a given library or collection of like maps (e.g., shapes, single actions, symbols, etc.). The HMI may be configured to monitor for certain gestures based on selected library or collection, via a configuration panel that allows selection of collection or classes of maps to be used.

The method 1400, in step 1408, includes, upon a match, causing, by the processor, execution of the application or operating-system function-call associated with a successful authenticated input.

Quadrants

Figure 15:
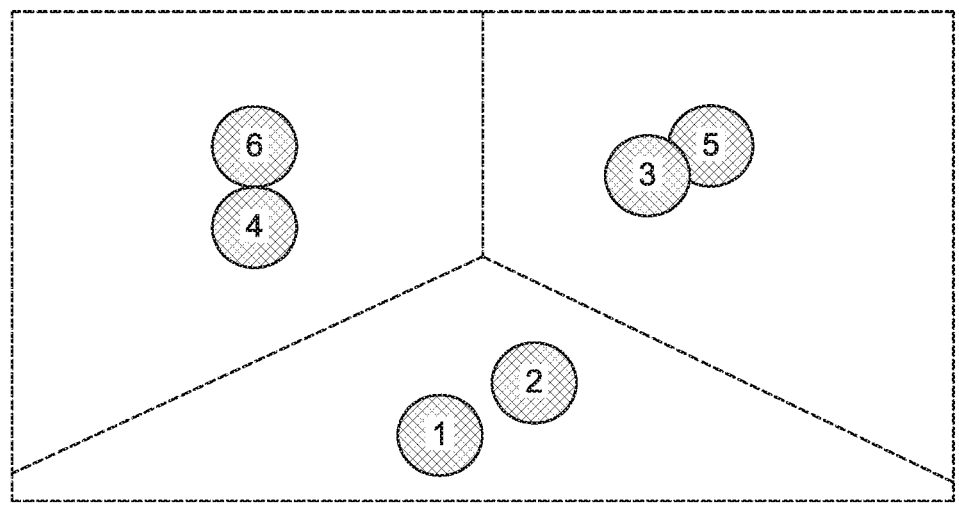
FIGS. 15, 16, 17, and 18, each depicts a diagram illustrating an exemplary embodiments of configuration of divided regions (i.e., Quadrant), in accordance with an illustrative embodiment.
Figure 16:
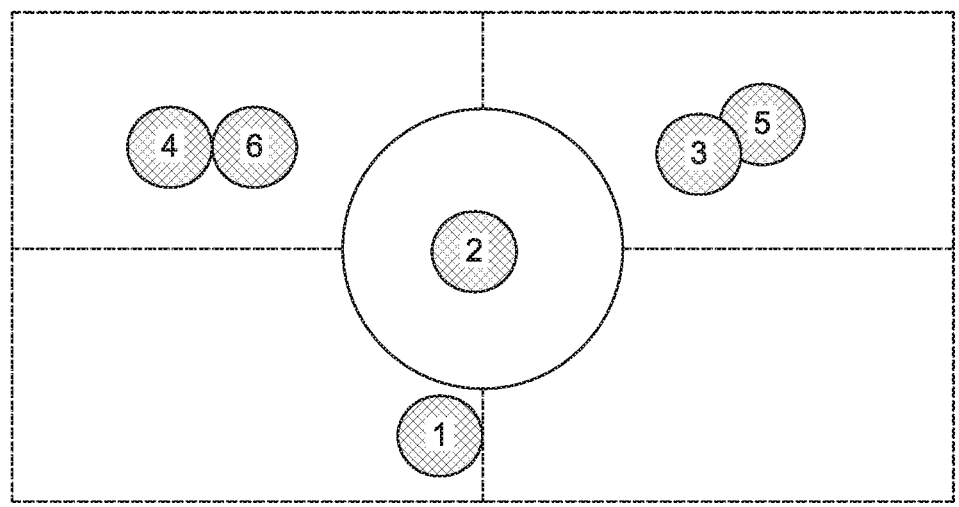
Figure 17:
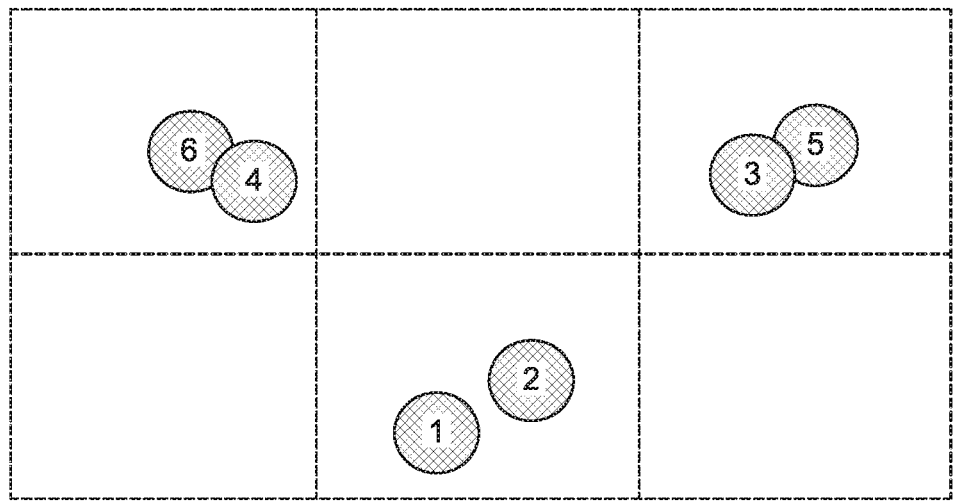
Figure 18:
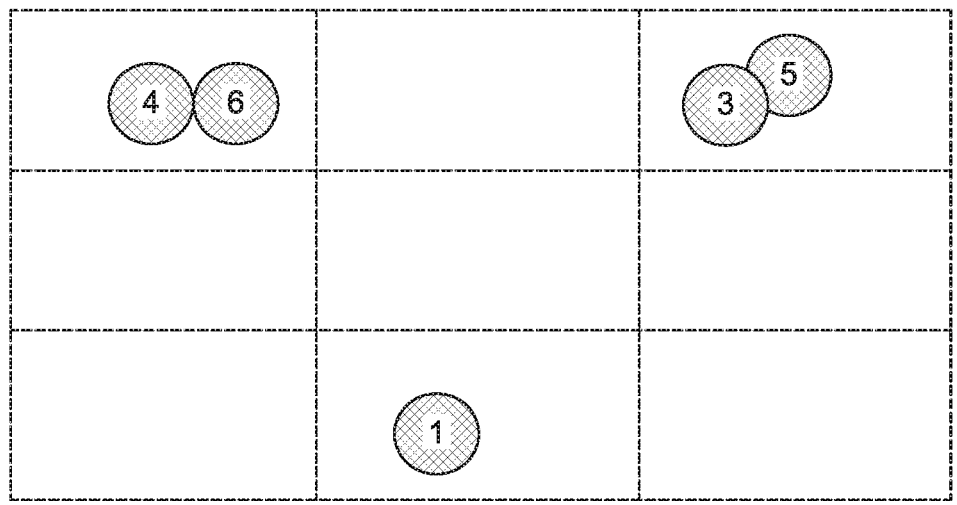

Quadrants as used herein refers to any of such divided regions of the touch screen and such division can be in 2, 3, 4, 5, 6, 7, 8, 9, 10, 11, or 12 divisions. Exemplary embodiments of configuration of divided regions are presented in FIGS. 15, 16, 17, and 18. In FIG. 15, a three-region quadrant is shown. In FIG. 16, a five-region quadrant is shown. In FIG. 17, a six-region quadrant is shown. In FIG. 18, a nine-region quadrant is shown. Here, each of the regions are shown with example inputs and their respective sequences. Other sequences and patterns, described, herein, may be applied to these quadrants without departing from the spirit of the disclosure.

Gesturing Shortcuts

According to another embodiment, the multiple spatially- and pattern-defined touch inputs are received via the transparent input screen to form a shortcut pattern. The spatially- and pattern-defined shortcut facilitates an operator's execution of operations and commands using the location of inputs on a touch screen that avoids the need to have lengthy touch interaction sequence to execute a command/operation on touch based devices. The touch screen defines, for example, four virtual quadrants to which a pattern (i.e., gesture) is applied. The combination of received pattern and the associated spatial regions that received the patterns are used to trigger a pre-defined command, which is configurable by the operator, that is unique to that combination of pattern and location. For example, a "single tap" (i.e., a temporally constraint point input) on first region (i.e., an upper left quadrant of the touch screen) would cause the HMI to change magnification of certain portions of the rendered screen (i.e., "zoom") the screen, and a "single tap" on the fourth region (i.e., a lower right quadrant of the touch screen) would cause the HMI to render a next navigable control screen. To this end, the same action (i.e., "single tap") gesture triggers different operation based on the region (e.g., quadrant of the touch screen) to which the action is received by the GUI. The spatially- and pattern-defined shortcut facilitates use of gesturing inputs that are quick to receive, secure, and that are configurable to be associated with a command.

In some embodiments, the spatially- and pattern-defined shortcut facilitates invocation of a specific HMI screen.

In some embodiments, the spatially- and pattern-defined shortcut facilitates invocation of setting values for certain critical control parameters.

In some embodiments the spatially- and pattern-defined shortcut facilitates invocation of a control screen to adjust display brightness of the touch-screen display.

Figure 19:
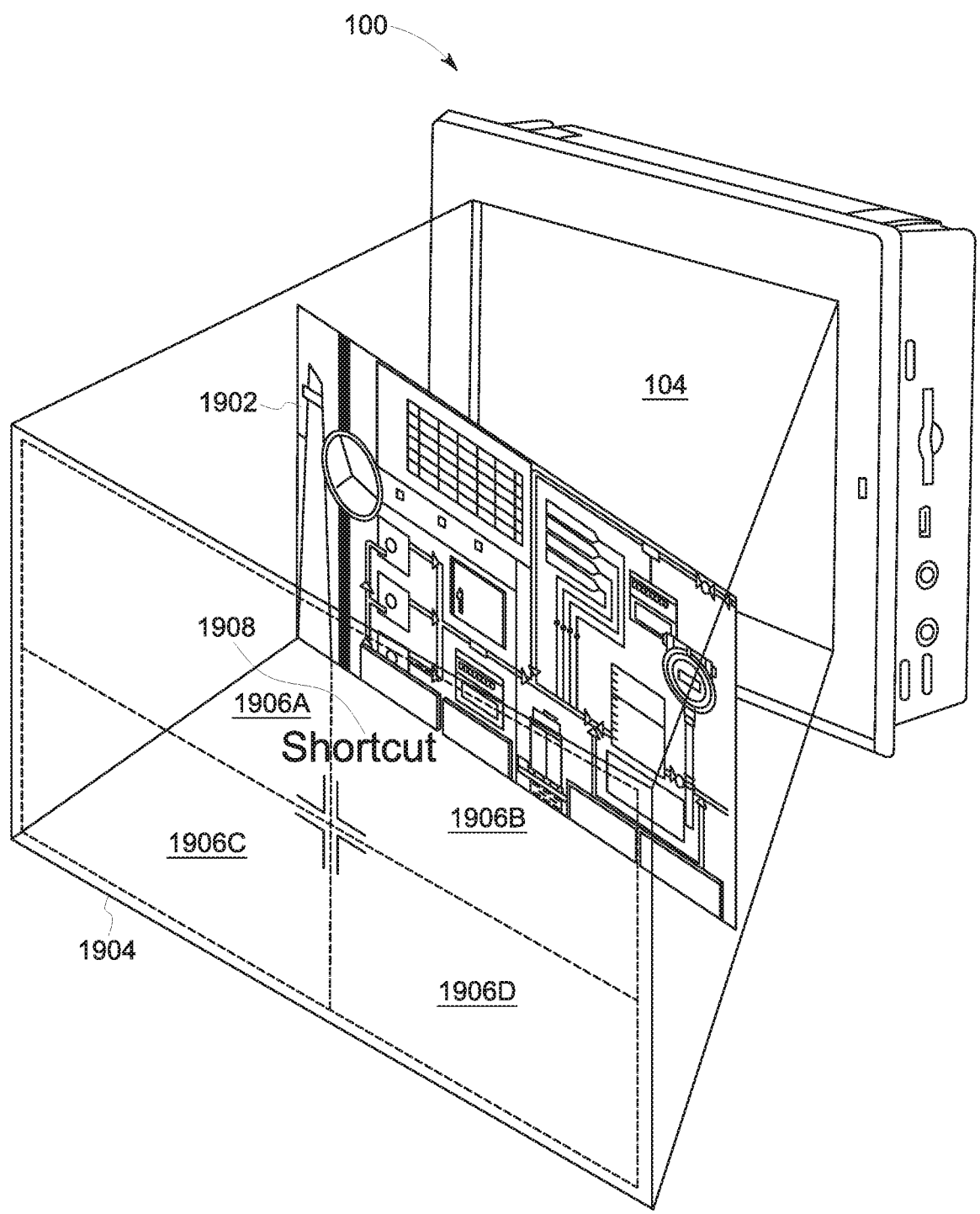
FIG. 19 depicts an example graphical user interface (GUI) configured to receive spatially- and pattern-defined touch input shortcut, in accordance with an illustrative embodiment, for example, for example, for use in association with an industrial automation system.

In some embodiments, the shortcut pattern is invoked from a control screen by selection of a shortcut widget presented thereon. FIG. 19 depicts an example graphical user interface (GUI) configured to receive spatially- and pattern-defined touch input shortcut, in accordance with an illustrative embodiment, for example, for example, for use in association with an industrial automation system. As shown in FIG. 19, upon selection of a shortcut widget in a control screen 1902, the GUI is configured to generate a transparent layer or panel (shown as 1904) over the control screen 1902. The transparent layer or panel 1904 includes a plurality of spatially-defined regions 1906 (shown as 1906a, 1906b, 1906c, and 1906d). The transparent layer or panel 1904 may include a text 1908 indicating that a shortcut input is active.

In some embodiments, the shortcut pattern is invoked from a password receiving screen in which a given matched sequence received thereat provides access to the GUI (i.e., unlock the screen) as well as the automatic invocation of an executable command or access to a configuration panel. In such embodiment, the combined password and shortcut GUI further reduces the number of actions needed to be taken by an operator when invoking the executable command or access the configuration panel.

Process to Define Gesturing Shortcuts

The spatially- and pattern-defined touch shortcuts may be defined as described in relation to FIGS. 9, 10, 11, 12, and 13. In addition, the GUI may prompt the user to associate an executable command or a configuration panel to a given spatially- and pattern-defined touch shortcuts, once defined.

Figure 20:
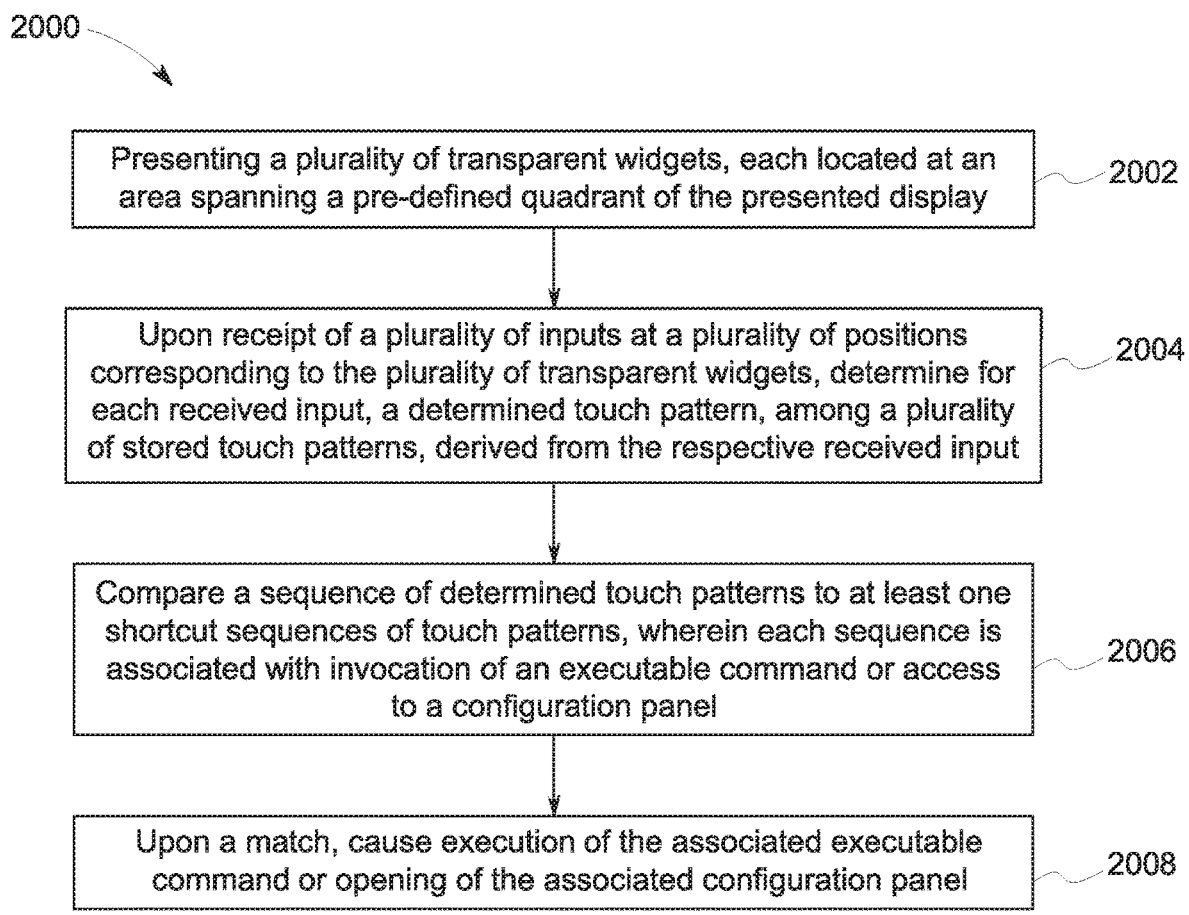
FIG. 20 depicts a method of receiving a sequence of spatially- and pattern-defined touch inputs, at a graphical user interface, of a touch-screen input device, in an industrial automation system, to trigger an associated user interface command (i.e. as a touch-based shortcut), in accordance with an illustrative embodiment.

FIG. 20 depicts a method 2000 of receiving a sequence of spatially- and pattern-defined touch inputs, at a graphical user interface, of a touch-screen input device, in an industrial automation system, to trigger an associated user interface command (i.e. as a touch-based shortcut). FIG. 20 is described in relation to FIG. 19.

The method 2000, in step 2002, includes presenting, by a processor, via a touch-screen display (e.g., 104) of the touch-screen input device (e.g., 100), a plurality of transparent widgets (e.g., an object (e.g., 1906a, 1906b, 1906c, and 1906d) generated and monitored for tactile input in the rendered display or a virtual region in the rendered display monitored for tactile input), each located at an area spanning a pre-defined quadrant of the presented display (e.g., 104).

The method 2000, in step 2004, includes, upon receipt, via the touch-screen display, of a plurality of inputs (e.g., sequences 210a-210d, 302a-302d, 402a-402d, 502, and 602, shown in FIGS. 2-6) at a plurality of positions (e.g., 202, 204, 206, 208) corresponding to the plurality of transparent widgets, determining, by the processor, for each received input, a determined touch pattern, among a plurality of stored touch patterns, derived from the respective received input.

The method 2000, in step 2006, includes comparing, by the processor, a sequence of determined touch patterns to at least one user-interface (UI) function call associated with i) a determined touch pattern, among a plurality of stored touch patterns, derived from the input and ii) a transparent widget location, among the pre-defined quadrants, derived from the received position. In some embodiments, a logic monitors and interprets the gesture applied at a specific location. The logic may compare, following a pre-processing operation that determines a path that is associated with the inputs, the determined path to a set of gesture maps, each associated with a given pattern. Multiple gesture maps may be associated with a given library or collection of like maps (e.g., shapes, single actions, symbols, etc.). The HMI may be configured to monitor for certain gestures based on selected library or collection, via a configuration panel that allows selection of collection or classes of maps to be used.

The method 2000, in step 2008, includes, upon a match, causing, by the processor, execution of the associated executable command or opening of the associated configuration panel.

Figure 21:
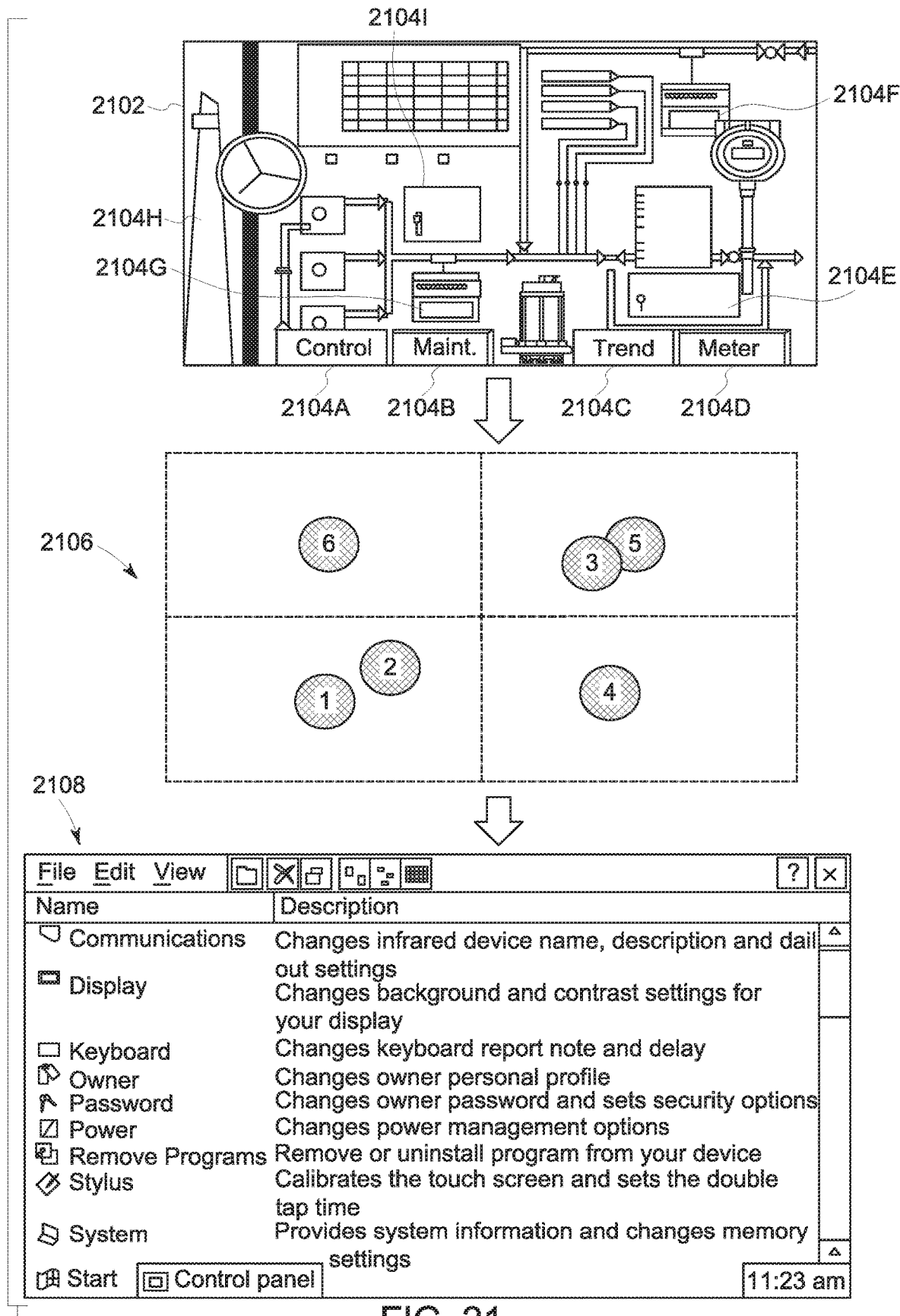
FIG. 21 depicts a diagram of an example process to invoke an associated executable command or to open an associated configuration panel.

FIG. 21 depicts a diagram of an example process to invoke an associated executable command or to open an associated configuration panel. In FIG. 21, the GUI presents a control screen 2102. The control screen 2102 includes multiple widgets 2104 (shown as 2104a, 2104b, 2104c, 2104d, 2104e, 2104f, 2104g, 2104h, and 2104i) configured to receive an input to adjust a control setting. Upon receipt of a sequence of spatially- and pattern-defined touch shortcuts 2106 and a matched of the sequence to a corresponding command, e.g., to open a configuration panel, the GUI is configured to present the configuration panel 2108. In some embodiments, the sequence of spatially- and pattern-defined touch shortcuts 2106 is also used as a password to authenticate an operation and allow access to the active control of the GUI.

Example Computing Device

Figure 22:
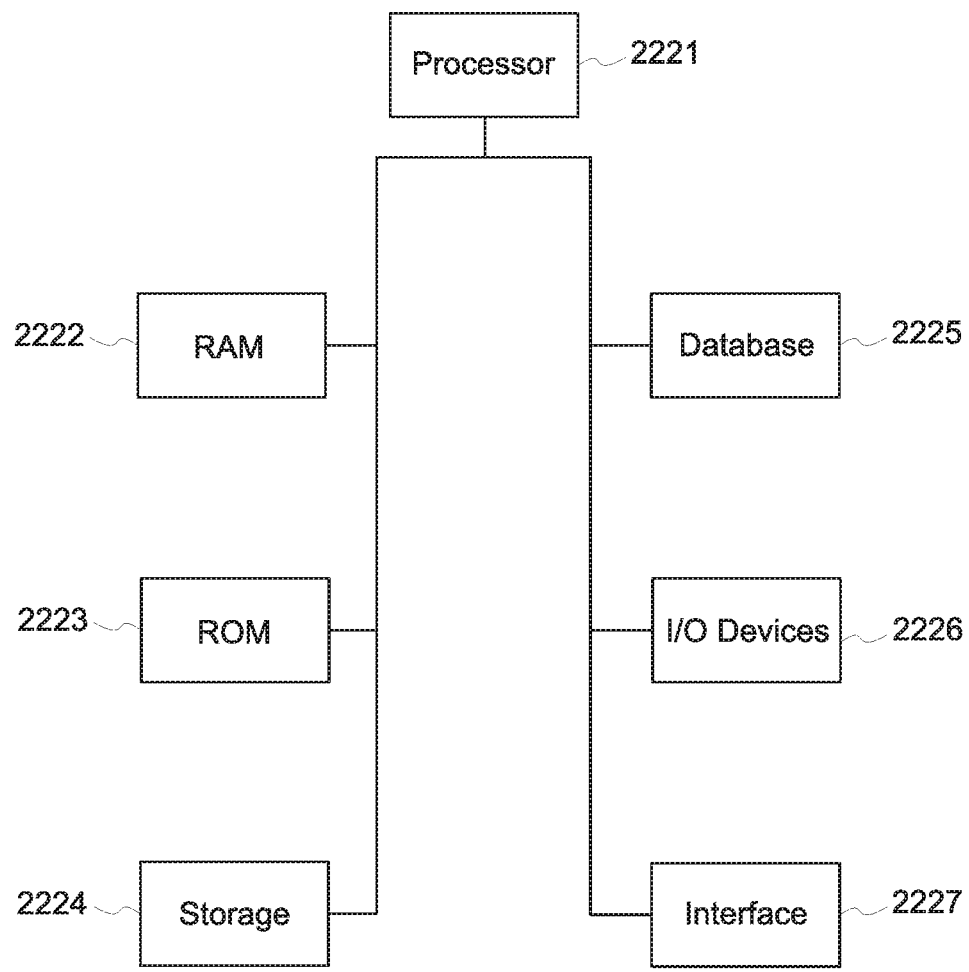
FIG. 22 illustrates an exemplary computer that can be used for configuring hardware devices in an industrial automation system.

FIG. 22 illustrates an exemplary computer that can be used for configuring hardware devices in an industrial automation system. In various aspects, the computer of FIG. 22 may comprise all or a portion of the development workspace 100, as described herein. As used herein, "computer" may include a plurality of computers. The computers may include one or more hardware components such as, for example, a processor 2221, a random access memory (RAM) module 2222, a read-only memory (ROM) module 2223, a storage 2224, a database 2225, one or more input/output (I/O) devices 2226, and an interface 2227. Alternatively and/or additionally, controller 2220 may include one or more software components such as, for example, a computer-readable medium including computer executable instructions for performing a method associated with the exemplary embodiments. It is contemplated that one or more of the hardware components listed above may be implemented using software. For example, storage 2224 may include a software partition associated with one or more other hardware components. It is understood that the components listed above are exemplary only and not intended to be limiting.

Processor 2221 may include one or more processors, each configured to execute instructions and process data to perform one or more functions associated with a computer for indexing images. Processor 2221 may be communicatively coupled to RAM 2222, ROM 2223, storage 2224, database 2225, I/O devices 2226, and interface 2227. Processor 2221 may be configured to execute sequences of computer program instructions to perform various processes. The computer program instructions may be loaded into RAM 2222 for execution by processor 2221. As used herein, processor refers to a physical hardware device that executes encoded instructions for performing functions on inputs and creating outputs.

RAM 2222 and ROM 2223 may each include one or more devices for storing information associated with operation of processor 2221. For example, ROM 2223 may include a memory device configured to access and store information associated with controller 2220, including information for identifying, initializing, and monitoring the operation of one or more components and subsystems. RAM 2222 may include a memory device for storing data associated with one or more operations of processor 2221. For example, ROM 2223 may load instructions into RAM 2222 for execution by processor 2221.

Storage 2224 may include any type of mass storage device configured to store information that processor 2221 may need to perform processes consistent with the disclosed embodiments. For example, storage 2224 may include one or more magnetic and/or optical disk devices, such as hard drives, CD-ROMs, DVD-ROMs, or any other type of mass media device.

Database 2225 may include one or more software and/or hardware components that cooperate to store, organize, sort, filter, and/or arrange data used by controller 2220 and/or processor 2221. For example, database 2225 may store hardware and/or software configuration data associated with input-output hardware devices and controllers, as described herein. It is contemplated that database 2225 may store additional and/or different information than that listed above.

I/O devices 2226 may include one or more components configured to communicate information with a user associated with controller 2220. For example, I/O devices may include a console with an integrated keyboard and mouse to allow a user to maintain a database of images, update associations, and access digital content. I/O devices 2226 may also include a display including a graphical user interface (GUI) for outputting information on a monitor. I/O devices 2226 may also include peripheral devices such as, for example, a printer for printing information associated with controller 2220, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 2227 may include one or more components configured to transmit and receive data via a communication network, such as the Internet, a local area network, a workstation peer-to-peer network, a direct link network, a wireless network, or any other suitable communication platform. For example, interface 2227 may include one or more modulators, demodulators, multiplexers, demultiplexers, network communication devices, wireless devices, antennas, modems, and any other type of device configured to enable data communication via a communication network.

Example Industrial Automation Systems

Figure 23:
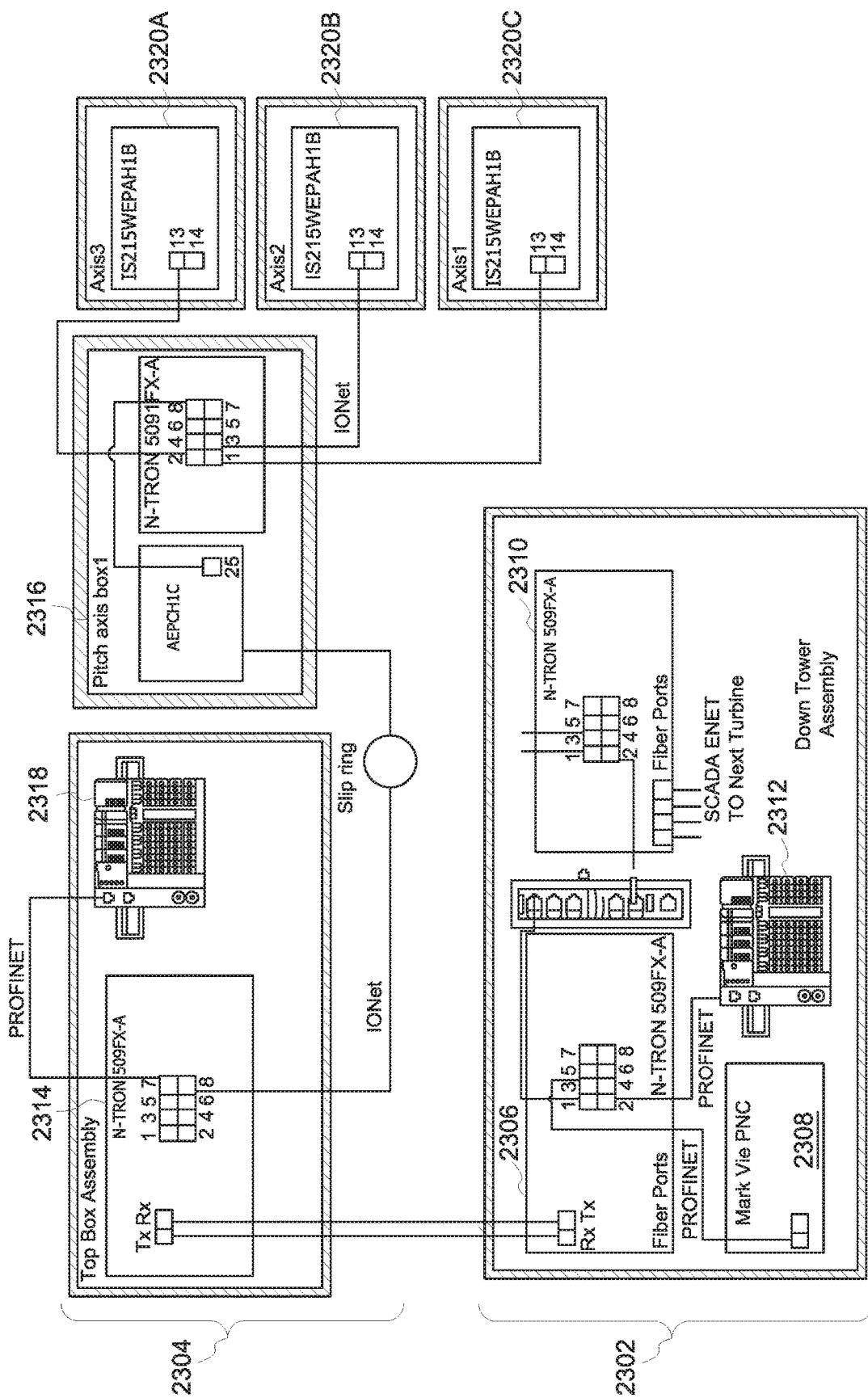
FIGS. 23 and 24 are diagrams of example industrial automation systems, in accordance with an illustrative embodiment.
Figure 24:
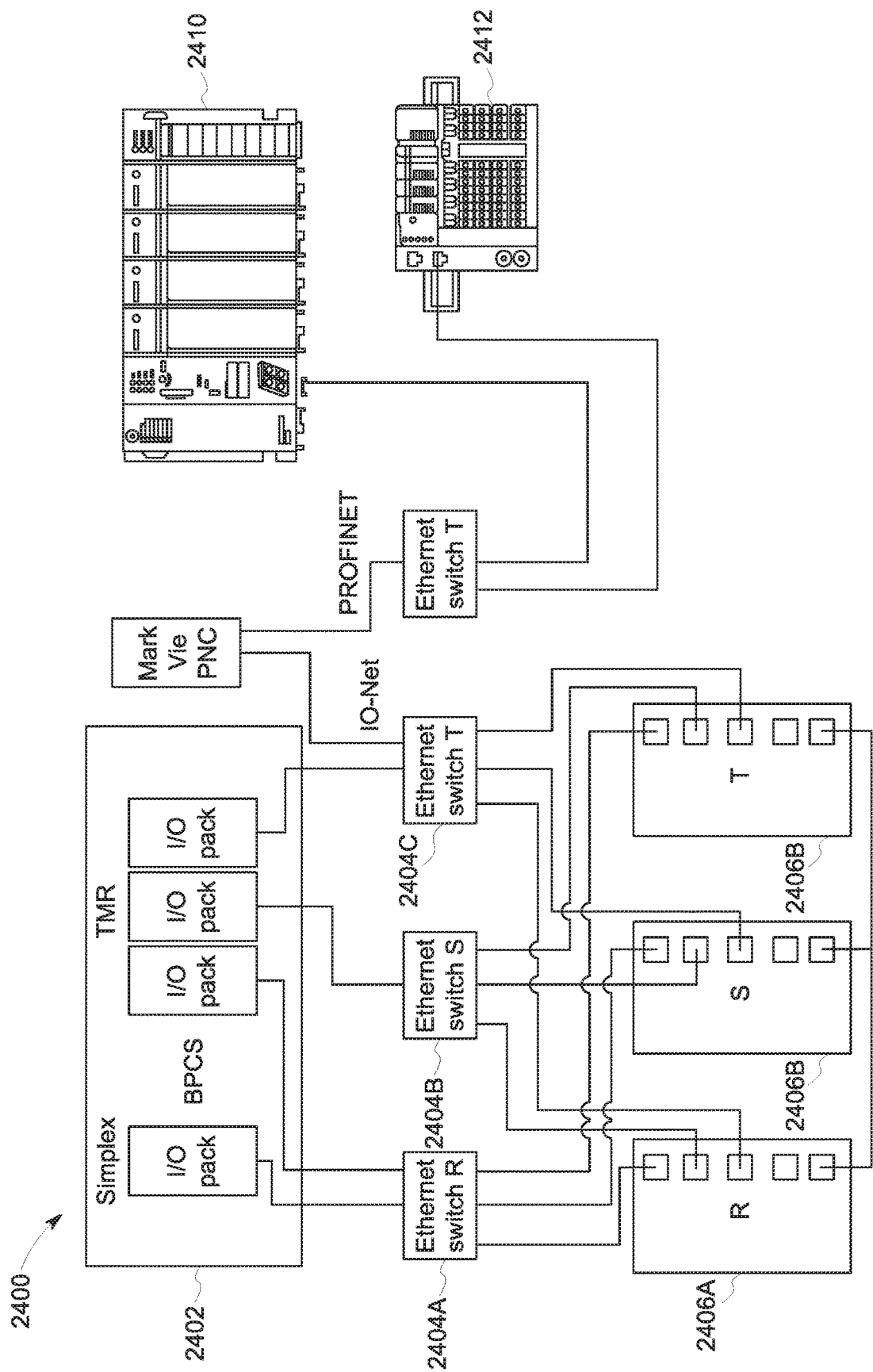

FIGS. 23 and 24 are diagrams of example industrial automation systems, in accordance with an illustrative embodiment. As shown in FIG. 23, the industrial automation system 2300 comprises an example control system for a wind turbine generator and includes a first local network 2302 located at the base of the wind turbine connected to a second local network 2304 located at the turbine cab. The first local network 2302 includes a network device 2306 having a communication link (e.g., via Profinet, Profibus, InterCAD) and communicates with a controller 2308 (shown as "Mark VIe 2308"), a SCADA system 2310 to connect to other wine turbine generators, and a controller 2312 to monitoring conditions at the base of the tower. The second local network 2304 includes a second network device 2314 having a communication link (e.g., via Profinet, Profibus, InterCAD) and communicates with controllers 2316 for each pitch axis (e.g., that regulates control of the pitch, yaw, and rotation of one of the multiple blades of the turbine), and controller 2318 for monitor conditions at the nacelle of the tower. The controllers 2316 connect to controllers 2320a, 2320b, 2320c for each of the blade rotatable axis.

As shown in FIG. 24, the industrial automation system 2400 comprises an example control system for a power plant and include a Mark VIe controller 2402 for core engine controls. To provide redundancy, the controller 2402 interfaces to sets of network devices (shown as Ethernet switches 2404a, 2404b, and 2404c) that connects to a set of controllers 2406a, 2406b, 2406c. The controller 2402 further connects to a Mark Vie PNC controller 2408 which couples to auxiliary controllers 2410, 2412 in the power plant.

Each of the controllers 2306, 2308, 2310, 2318, 2316, 2320, 2402, 2406, 2410, 2412 may include, individually, tens to hundreds of connected modules and submodules.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain. It will be apparent to those skilled in the art that various modifications and variations.

What is claimed is:

1. A method of receiving a sequence of spatially-and-pattern-defined touch inputs, at a graphical user interface, of a touch-screen input device, in an industrial automation system, to trigger an associated user interface command on the touch-screen input device, the method comprising:
   storing a plurality of touch patterns and a plurality of sets of touch patterns, each said set of touch patterns associated with one of a plurality of user-interface (UI) function calls;
   presenting, by a processor, via a touch-screen display of the touch-screen input device, a user interface including a control screen for the industrial automation system;
   rendering, via the user interface, a transparent input screen superimposed over the control screen for the industrial automation system by generating a separate transparent layer, wherein the transparent input screen enables a user to view the control screen but is configured to prevent access to the control screen;
   dividing the transparent input screen into a plurality of pre-defined quadrants associated with a plurality of transparent widgets;
   associating a first transparent widget of the plurality of transparent widgets with a first pre-defined quadrant of the plurality of pre-defined quadrants and a second transparent widget of the plurality of transparent widgets with a second pre-defined quadrant of the plurality of pre-defined quadrants;
   receiving, via the touch-screen display, a first input at a position corresponding to the first pre-defined quadrant and a second input at a position corresponding to the second pre-defined quadrant;
   determining, by the processor, i) a first determined touch pattern, of the stored plurality of touch patterns, based on the first input and ii) a second determined touch pattern, of the stored plurality of touch patterns, based on the second input;
   determining a UI function call by comparing the first determined touch pattern and the second determined touch pattern to the stored plurality of sets of touch patterns; and
   causing, by the processor, execution of the determined user-interface (UI) function call.

2. The method of claim 1, wherein each of the plurality of transparent widgets has a pre-defined non-overlapping region among each of the neighboring pre-defined quadrants rendered on the presented user interface.

3. The method of claim 1, wherein each of the plurality of transparent widgets has an overlapping region with a neighboring transparent widget.

4. The method of claim 1, wherein the first determined touch pattern comprises a contiguous pattern selected from the group consisting of a point, a line, an arc, and a polygonal shape.

5. The method of claim 1, wherein the first determined touch pattern comprises two or more contiguous patterns, each selected from the group consisting of a point; a line, an arc and a polygonal shape.

6. The method of claim 1, wherein the user-interface (UI) function call is associated with an operating-system function call.

7. The method of claim 1, wherein the user-interface (UI) function call is associated with a runtime-application function call.

8. The method of claim 1, wherein the user-interface (UI) function call is associated with presentation of an operating system configuration window.

9. The method of claim 1, comprising:
   receiving, via the touch-screen display, of a second input i) originating at a first position on the user-interface associated with a first transparent widget presented at a first quadrant, and ii) terminating at a second position on the user interface associated with a second transparent widget presented at a second quadrant, determining, by the processor, a second user-interface (UI) function call associated with i) a determined touch pattern, based on the second input, and ii) transparent-widget pair locations, among the pre-defined quadrants, based on the received positions; and causing, by the processor, execution of the second user-interface (UI) function call.

10. The method of claim 9, comprising:

receiving; via the touch-screen display, of a third input having traversed across i) a first transparent widget presented at a first quadrant, ii) a second transparent widget presented at a second quadrant, and iii) a third transparent widget presented at a third quadrant, determining, by the processor, a third user-interface (UI) function call associated with i) a determined touch pattern, based on the third input, and ii) at least three transparent widget locations, among the pre-defined quadrants, based on the received positions; and causing, by the processor, execution of the third user-interface (UI) function call.

11. The method of claim 1, comprising:

presenting, by the processor, via the touch-screen display, a visual representation of a graphical element at a border region located between each neighbor transparent widgets among the plurality of transparent widgets.

12. The method of claim 1, comprising:

presenting, by the processor, via the touch-screen display, a visual representation of an indicia for a given user-interface (UI) function call associated with a given transparent widget.

13. The method of claim 1, wherein each of the plurality of transparent widgets has a minimum transparent value associated with presentation of a transparent graphical element.

14. The method of claim 1, wherein at least one of the plurality of transparent widgets have a transparent value between a minimum transparent value and a maximum transparent value associated with presentation of a transparent graphical element.

15. The method of claim 14, wherein the plurality of transparent widgets comprise a first transparent widget and a second transparent widget, the first transparent widget having a first color value and the second transparent widget having a second color value, wherein the first color value is different from the second color value.

16. The method of claim 1, comprising:

presenting, by the processor, a visual representation of a configuration window, the configuration window having a plurality of selectable input fields, including a first selectable input field, a second selectable input field, and a third selectable input field, wherein the first selectable input field includes a list of one or more triggerable function calls selected from the group consisting of operating system user-interface function calls, run-time application function calls, and a combination thereof, wherein the second selectable input field includes a list of one or more quadrants associated with execution of the triggerable function calls selected in the first selectable input field, and wherein the third selectable input field includes a list of touch patterns, to be used in conjunction with the selected one or more quadrants selected in the second selectable input field, the selected touch pattern being associated with execution of the function calls selected in the first selectable input field.

17. The method of claim 16, wherein the selection from each of the plurality of selectable input fields, collectively defines a gesture-operation map.

18. A system that triggers executions of user interface commands, using spatially- and pattern-defined touch inputs received at a touch-screen display associated with the system, the system comprising:

a touch-screen display;

a processor operatively coupled to the touch-screen display; and a memory operatively coupled to the processor, the memory having instructions stored thereon, wherein the instructions, when executed by the processor, cause the processor to:

store a plurality of touch patterns and a plurality of sets of touch patterns, each said set of touch patterns associated with one of a plurality of user-interface (UI) function calls;

present via the touch-screen display, a user interface including a control screen for an industrial automation system;

render, via the user interface, a transparent input screen superimposed over the control screen for the industrial automation system by generality a separate transparent layer, wherein the transparent input screen enables a user to view the control screen but is configured to prevent access to the control screen;

dividing the transparent input screen into a plurality of pre-defined quadrants associated with a plurality of transparent widgets;

associating a first transparent widget of the plurality of transparent widgets with a first pre-defined quadrant of the plurality of pre-defined quadrants and a second transparent widget of the plurality of transparent widgets with a second pre-defined quadrant of the plurality of pre-defined quadrants;

receive, via the touch-screen display, a first input at a position corresponding to the first pre-defined quadrant and a second input at a position corresponding to the second pre-defined quadrant;

determine i) a first determined touch pattern, of the stored plurality of touch patterns, based on the first input and ii) a second determined touch pattern, of the stored plurality of touch patterns, based on the second input;

determine a UI function call by comparing the first determined touch pattern and the second determined touch pattern to the stored plurality of sets of touch patterns; and cause execution of the determined user-interface (UI) function call.

19. A non-transitory computer-readable medium for execution on a computing device having a touch-screen display, to trigger execution of user interface commands, using spatially- and pattern-defined inputs received at the touch-screen display, the computer-readable medium having instructions stored thereon, wherein the instructions, when executed by a processor, causes the processor to:

store a plurality of touch patterns and a plurality of sets of touch patterns each said set of touch patterns associated with one of a plurality of UI function calls;

present via a touch-screen display, a user interface including a control screen for an industrial automation system;

render, via the user interface, a transparent input screen superimposed over the control screen for the industrial automation system by generating a separate transparent layer, wherein the transparent input screen enables a user to view the control screen but is configured to prevent access to the control screen;

dividing the transparent input screen into a plurality of pre-defined quadrants associated with a plurality of transparent widgets;

associating a first transparent widget of the plurality of transparent widgets with a first pre-defined quadrant of the plurality of pre-defined quadrants and a second transparent widget of the plurality of transparent widgets with a second pre-defined quadrant of the plurality of pre-defined quadrants;

receive, via the touch-screen display, a first input at a position corresponding to the first pre-defined quadrant and a second input at a position corresponding to the second pre-defined quadrant;

determine i) a first determined touch pattern, of the stored plurality of touch patterns, based on the first input and ii) a second determined touch pattern, among the stored plurality of touch patterns, from the second input;

determine a UI function call by comparing the first determined touch pattern and the second determined touch pattern to the stored plurality of sets of touch patterns; and cause execution of the determined user-interface (UI) function call.

20. A method of receiving spatially- and pattern-defined touch inputs, at a graphical user interface, of a touch-screen input device, in an industrial automation system, to trigger an associated user interface command, the method comprising:

storing a plurality of touch patterns and a plurality of sets of touch patterns each said set of touch patterns associated with one of a plurality of UI function calls;

presenting, by a processor, via a touch-screen display, a user interface including a control screen for the industrial automation system;

dividing the transparent input screen into a plurality of pre-defined quadrants associated with a plurality of transparent widgets for a control application in the industrial automation system;

associating a first transparent widget of the plurality of transparent widgets with a first pre-defined quadrant of the plurality of pre-defined quadrants and a second transparent widget of the plurality of transparent widgets with a second pre-defined quadrant of the plurality of pre-defined quadrants, wherein each of the plurality of transparent widgets is associated with a user-interface (UI) function call, and wherein the control application maintains a virtual map defining a plurality of pre-defined quadrants over the presented user interface;

receiving, via the touch screen display, a first input at a position corresponding to a first pre-defined quadrant and a second input at a position corresponding to a second pre-defined quadrant;

determining, by the processor, i) a first determined touch pattern, of the stored plurality of touch patterns, based on the first input and ii) a second determined touch pattern, of the stored plurality of touch patterns, based on the second input;

determining a UI function call by comparing the first determined touch pattern and the second determined touch pattern to the stored plurality of sets of touch patterns; and causing, by the processor, execution of the determined user-interface (UI) function call.

* * * * *